US006909763B2

(12) United States Patent
Matsubayashi

(10) Patent No.: US 6,909,763 B2
(45) Date of Patent: Jun. 21, 2005

(54) IMAGE PROCESSING APPARATUS

(75) Inventor: Kazuhiro Matsubayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 687 days.

(21) Appl. No.: 09/894,620

(22) Filed: Jun. 28, 2001

(65) Prior Publication Data
US 2002/0018146 A1 Feb. 14, 2002

(30) Foreign Application Priority Data
Jul. 4, 2000 (JP) .................................. 2000-202649

(51) Int. Cl.[7] .............................................. H04N 9/64
(52) U.S. Cl. ..................................................... 375/700
(58) Field of Search ................................ 348/699, 700; 375/240.12, 240.13, 240.18, 240.24; H04N 7/12

(56) References Cited

U.S. PATENT DOCUMENTS

| 5,680,483 | A | * | 10/1997 | Tranchard ................... 382/239 |
| 5,754,233 | A | * | 5/1998 | Takashima ............... 348/390.1 |
| 6,330,286 | B1 | * | 12/2001 | Lyons et al. ........... 375/240.28 |
| 6,563,549 | B1 | * | 5/2003 | Sethuraman ................ 348/700 |

* cited by examiner

Primary Examiner—Nhon Diep
(74) Attorney, Agent, or Firm—Cowan, Liebowitz & Latman

(57) ABSTRACT

According to the present invention, an image processing apparatus is provided for inputting moving image data composed of a plurality of frames, for detecting definitions of a plurality of frames in the moving image data and a range of successive frames indicating an image similar to that of the image of the frame which is arbitrarily designated among the moving image data, and for selecting one of the frames in the moving image data which is inputted based on the definition and the similarity range.

13 Claims, 20 Drawing Sheets

IMAGE PROCESSING APPARATUS

BACKGROUND OF THE INVENTION

1. Field of the Invention

The present invention relates to an image processing apparatus, and more particularly, to a process for selecting a desired image from an inputted moving image.

2. Related Background Art

Digital television receivers have been developed as apparatuses for inputting and processing moving image data.

FIG. 24 shows the structure of such a digital television receiver in which, in particular, moving image data is received and a frame designated by a user among received moving image data is outputted to a printer, etc. (not shown) as a still image. Referring to FIG. 24, reference numeral 2401 denotes a broadcast receiving unit; 2402 denotes a received data analyzing unit; 2403 denotes a received data storing unit; 2404 denotes a moving image output unit; 2405 denotes a moving image decoding unit; 2406 denotes a still image output unit; and 2407 denotes an operation unit for designating an outputted frame.

Next, a description is given of an operation of the digital television receiver in FIG. 24 with reference to a flowchart of FIG. 25. In step S2501, the broadcast receiving unit 2401 receives digital television broadcast. In step S2502, the received data analyzing unit 2402 analyzes received data, divides the analyzed data into moving image data, audio data, and other data, and stores the divided data into the received data storing unit 2403.

In step S2503, the moving image decoding unit 2405 decodes encoded moving image data, and outputs the decoded moving image data to the moving image output unit 2406 on a frame basis. In step S2504, it is checked whether or not the operation unit 2407 issues an instruction for designating an output of a still image. If YES in step S2504, the processing routine advances to step S2505. If NO in step S2504, the processing routine returns to step S2401. In step S2505, the designated frame is outputted to a still image output unit 2408 as the still image.

As shown in FIG. 4, for example, a description is given to explain an example in which in a television program 401, after a scene 403 indicating that an anchorperson points out a flip chart, a scene 405 indicating that the flip is closed up continues for several seconds and, then, is changed to a scene 407 indicating the face of the anchorperson. It is frequently desired that the scene 405 indicating the anchorperson's face closed-up is outputted to the printer as a still image so as to memorize the contents thereof.

In this case, in the aforementioned digital television receiver, a viewer operates the operation unit 2407, thereby outputting the frame at that moment (frame 401B shown in FIG. 4) to the printer to be printed as the still image.

However, although it maintains a sufficient picture quality as long as it is viewed as the moving image, in many cases, a character, etc. become non-definitional if only a single frame is extracted as the still image. If the same subject to be photographed is captured, the definition of the image is varied frame by frame because of blur and a out-of-focus state which is caused by slight movement of a camera. In general, the viewer designates the frame without recognizing the foregoing and, therefore, a non-definitional frame is often extracted and printed.

SUMMARY OF THE INVENTION

Accordingly, it is an object of the present invention to solve the above-mentioned problems.

It is another object of the present invention to make it possible to output a more definitional frame having the same contents as those of a designated frame as a still image.

To accomplish the above-mentioned objects, according to an aspect of the present invention, there is provided an image processing apparatus comprising: input means for inputting a data string including moving image data composed of a plurality of frames; designating means for designating any desired frame among the moving image data; definition detecting means for detecting definitions of the plurality of frames in the moving image data; similarity range detecting means for detecting from the moving image data a range of successive frames indicating an image similar to that of the frame designated by the designating means; and selecting means for selecting one frame in the moving image data which is inputted by the input means, based on an output of the definition detecting means and an output of the similarity range detecting means.

Further objects, features and advantages of the present invention will become more apparent from the following description of the preferred embodiments with reference to the accompanying drawings.

DESCRIPTION OF THE PREFERRED EMBODIMENTS

Hereinbelow, a description will be given to explain embodiments of an image output device, a method, and a computer-readable storage medium according to the present invention.

Figure 1:
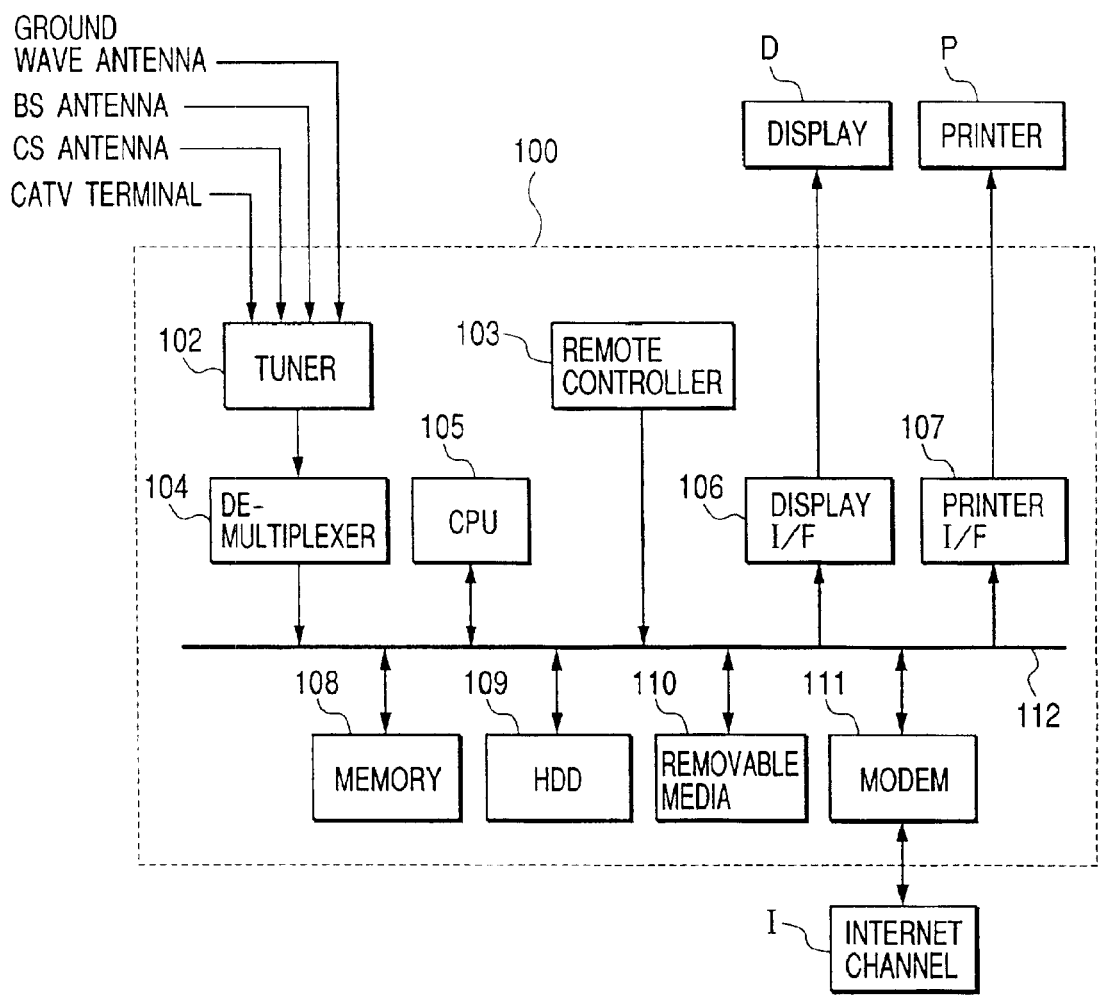
FIG. 1 is a diagram showing one example of the structure of a hardware of a digital television receiver.

FIG. 1 is a block diagram showing the structure of a hardware of a digital television receiver 100 according to a first embodiment of the present invention. Various antennas, a CATV terminal, a display, a printer, an Internet line, etc. can be connected to the digital television receiver 100.

A viewer selects a channel by a remote controller 103, then, a tuner 102 is controlled by a CPU 105, and broadcast data of a desired channel is obtained by the tuner 102 based on a signal inputted from the antenna or CATV terminal. According to the first embodiment, moving image data, audio data, and other code data of a plurality of channels are multiplexed as one stream, thereby obtaining broadcast data of one channel in the digital television broadcast. A demultiplexer 104 divides the multiplexed data and stores the respective divided data in a memory 108. The moving image data stored in the memory 108 is subjected to decoding and other processes by the CPU 105. The moving image data is outputted to a display D via a display I/F 106.

Also, the moving image data, audio data, and other code data can be distributed not only through the broadcast but also through the Internet via a modem 111. Alternatively, they can be distributed through removable media 110 such as a magnetic tape, magnetic disk, and optical disk. Or, data distributed through the broadcast, Internet, removable media 110 or the like is stored in an HDD 109 and the stored data is reproduced later. Although distribution through the broadcast is described below, in place thereof, as needed, the distribution through communication or a storage medium can be applied.

Further, from the respective frames forming the moving image, one frame designated by the remote controller 103 can be outputted to a printer P as a still image via a printer I/F 107. The respective blocks of FIG. 1 can mutually receive and transmit data therebetween through a bus 112.

Figure 2:
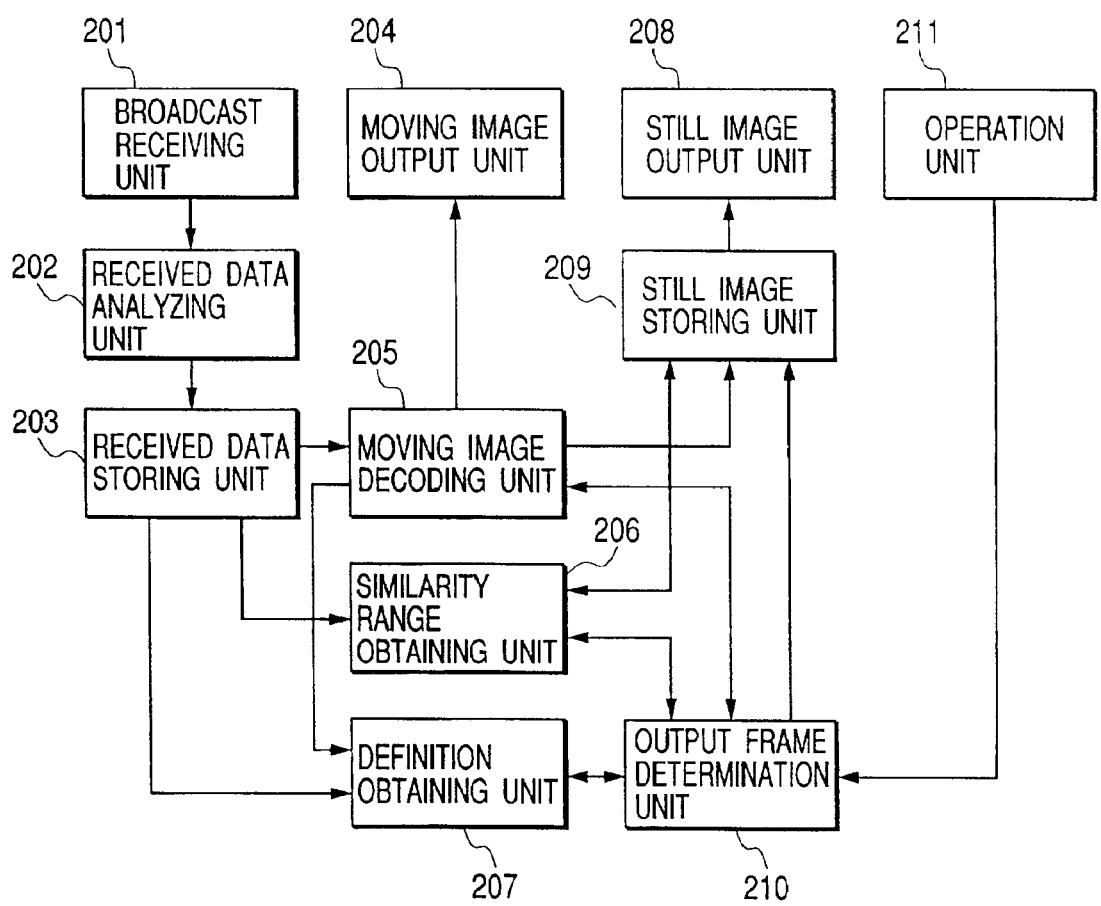
FIG. 2 is a diagram showing the structure of functions of an image output device.

FIG. 2 is a block diagram showing the structure of functions in the digital television receiver 100 shown in FIG. 1 in case of that, in particular, the moving image data is received, a predetermined frame is selected upon designating the frame, and the frame is outputted to the printer P as the still image.

Referring to FIG. 2, reference numeral 201 denotes a broadcast receiving unit; 202 denotes a received data analyzing unit; 203 denotes a received data storing unit; 204 denotes a moving image output unit; 205 denotes a moving image decoding unit; 206 denotes a similarity range obtaining unit; 207 denotes a definition obtaining unit; 208 denotes a still image output unit; 209 denotes a still image storing unit; 210 denotes an output frame determination unit; and 211 denotes an operation unit. Incidentally, in the structure of the hardware shown in FIG. 1, the above components are formed by the tuner 102, remote controller 103, demultiplexer 104, CPU 105, memory 108, and the like.

Next, a processing operation for outputting the still image is described with reference to a flowchart of FIG. 3.

In step S301, the broadcast receiving unit 201 receives digital television broadcast. In step S302, the received data analyzing unit 202 analyzes the received data, divides the analyzed data into the moving image data, audio data, and other data, and stores the divided data in the received data storing unit 203. The received data storing unit 203 has at least a storage capacity of an encoded data stream of duration of several to several tens seconds. A data output timing from the received data storing unit 203 to the moving image decoding unit 205 is controlled so as to hold the data stream of duration of several to several tens seconds preceding or subsequent to the frame outputted by the moving image decoding unit 205, which will be described later.

Figure 14:
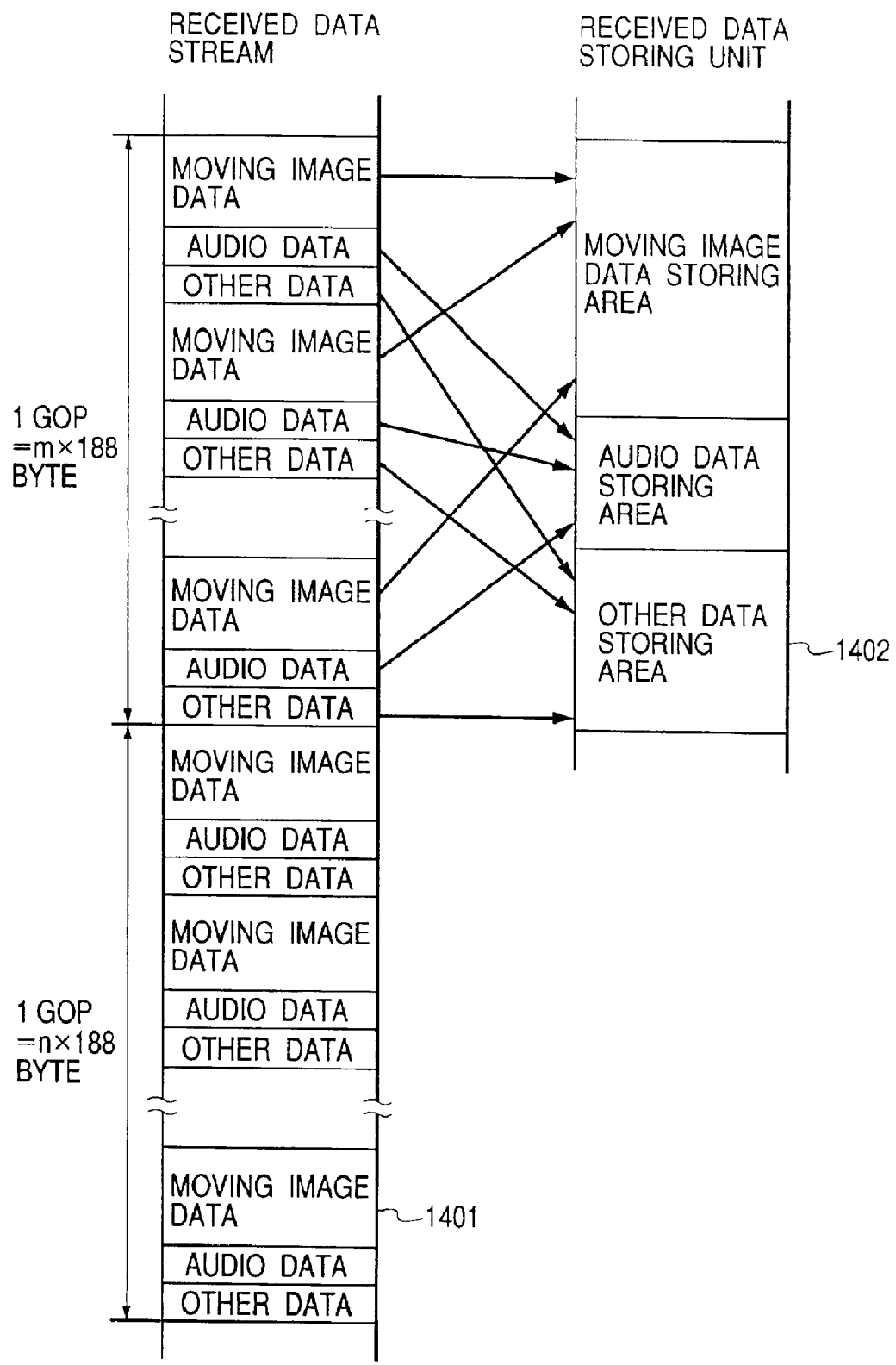
FIG. 14 is a diagram showing a storing area of received data.

In the first embodiment, the data stream to be received has been encoded in accordance with an MPEG2transport stream (hereinafter, referred to as an MPEG2-TS) format using a DOT or motion compensation predictive coding. FIG. 14 shows a data stream 1401 to be outputted by the broadcast receiving unit 201 and a memory map 1402 indicating a status of data to be stored in the received data storing unit 203.

In accordance with the MPEG2-TS, the encoded image, audio data, and other data are divided into a transport stream packet having 188 bytes data (hereafter, referred to as a TS packet), and the TS packet of the image data, audio data, and other data are multiplexed at a predetermined timing.

The MPEG2 format uses the motion compensation predictive coding and variable-length coding, and the amount of codes thereof are varied depending on contents of the image. In accordance with the MPEG2, intra-frame coding and inter-frame coding are combined to encode the image data, and the amounts of codes are also different between the intra-frame coding (I-frame) and the inter-frame coding (P-frame and B-frame).

Consequently, the head of the one-frame image data encoded can be hardly positioned at the head of the TS packet. There might exist a boundary portion between two frames in a single TS packet. In the first embodiment, it is assumed to receive the data stream which has been encoded so that the encoded data of 1 GOP (group of pictures) shown in FIG. 11, as a basic unit of MPEG2 coding, is distributed to an integer number of TS packets. The GOP indicates a group ranging from the I-frame to a frame just before the next I-frame. Referring to FIG. 14, the encoded image data of the first one-GOP, and the audio data and other data in association therewith are composed of m TS-packets. The encoded image data of the next one-GOP, and the audio data and other data in association therewith are composed of n TS-packets.

In step S303, the moving image decoding unit 205 decodes the encoded moving image data, and outputs the decoded moving image data to the moving image output unit 204 on a frame basis. In step S304, it is checked whether or not the operation unit 211 issues an instruction for designating an output of a still image. If YES in step S304, the processing routine advances to step S305. If NO in step S304, the processing routine returns to step S303.

In step 305, the output frame determination unit 210 searches the start position of the frame similar to the designated frame (frame designated by the operation unit 211) by tracing the past received data. In parallel therewith, the broadcast data is continuously received, stored, analyzed, and outputted in real time (in steps S301 and S303) to search as to how many frames similar to the designated frame are continued. The degree of similarity to the designated frame is obtained by the similarity range obtaining unit 206 and a specific process thereof will be described hereinafter.

In step S306, the output frame determination unit 210 determines the most definitional frame between the start frame and the end frame within the similarity range determined in step S305. The definition obtaining unit 207 obtains the definition of the frame and a specific process thereof will be described later.

In step S307, the output frame determination unit 210 causes the moving image decoding unit 205 to decode the image data having the most definitional frame determined in step S306 and outputting the decoded data to the still image storing unit 209. The still image output unit 208 reads the still image data stored in the still image storing unit 209 at a proper timing and the read data is outputted to the printer P, etc.

Figure 4:
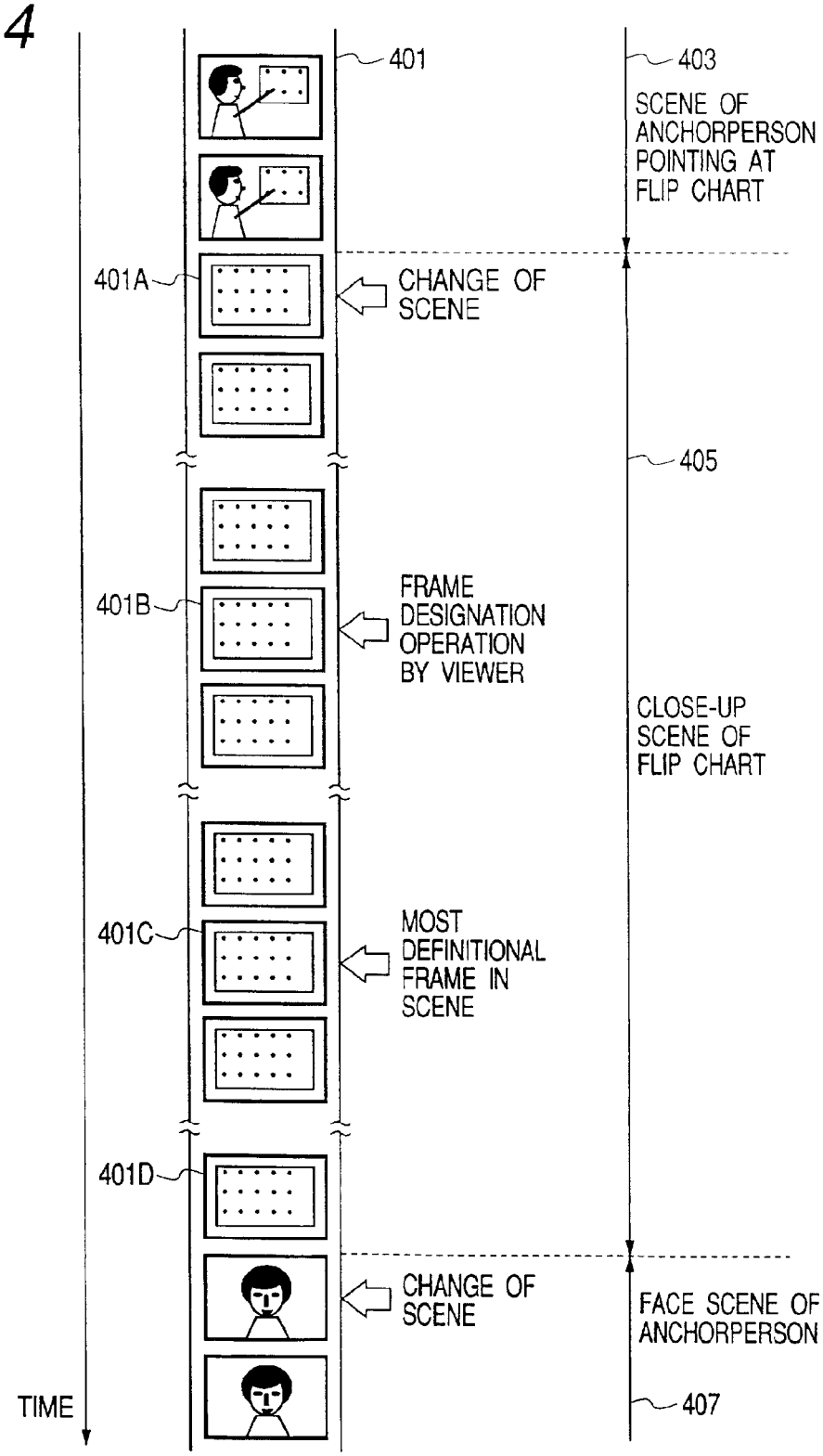
FIG. 4 is a diagram showing a specific example of a moving image.

According to the first embodiment, in the example in FIG. 4, when a viewer designates a frame 401B, a range of similarity is determined to be an image ranging from a frame 401A to a frame 401D, which indicate the similar image to that indicated by the designated frame 401B. In the image, the most definitional frame 401C is outputted to the printer P.

Although the example for receiving the television broadcast is described, in addition to the above-described example, when outputting the moving image which is distributed through the Internet or removable media, or when reproducing the moving image which is stored in the hard disk, the still image can also be outputted to the printer P in the above manner.

In addition, the still image can not be only outputted to the printer but also be displayed on a display screen as a temporary stop image. Further, the still image can be distributed through the Internet and stored in the removable media or hard disk. Although the case where data is outputted to the printer P is described in the first embodiment and other embodiments, in place thereof, data can be outputted to a screen, communication, or storage medium, as needed.

A detailed description is given of a processing operation in the similarity range obtaining unit 206, in other words, a obtaining method of the degree of similarity of the frame.

The degree of similarity can be digitized by using a method for obtaining an absolute value of a difference between luminance data of pixels corresponding to two frames and, then, adding up the absolute values of the differences of all pixels. In the case of the I-picture in the encoded image data, of DCT coefficients of each of the blocks, a DC component indicates an average luminance of each block. Therefore, the degree of similarity can be obtained by using a method for obtaining the absolute value of a difference between the DC components of corresponding blocks and, then, adding up the obtained absolute values of the differences of all blocks. In the case of the P- and B-pictures, the DC component of a reference frame is added and the resultant data is used as the DC component of the corresponding block, thereby detecting the degree of similarity.

Note that, any of the above-mentioned methods can be used to digitize the degree of similarity and other methods can also be used. Further, a plurality of methods can be combined.

Figure 5:
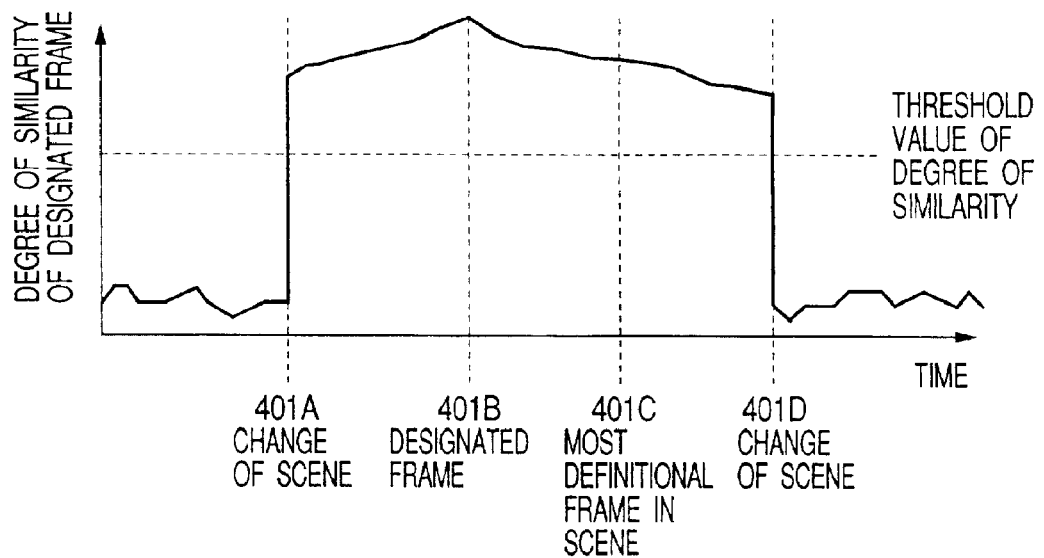
FIG. 5 is a graph showing digitized degrees of similarity between a designated frame and each frame.

FIG. 5 shows a graph of the degree of similarity between the designated frame 401B and respective frames in the vicinity of the frame 401B in FIG. 4. As shown in FIG. 5, the degree of similarity is obtained with respect to the designated frame 401B and the frame in the vicinity thereof, then, it is assumed that the frame is similar to the frame 401B when the degree of similarity excesses a predetermined threshold value, and the frame is not similar if it does not exceed the predetermined threshold value. In FIG. 5, the range of the similarity is a frame portion having the degree of similarity of not greater than the predetermined threshold value (before the frame 401A and after the frame 401D). The similarity range obtaining unit 206 determines the range of the frames 401A to 401D as the similarity range, and outputs similarity range information to the output frame determination unit 210.

A detailed description is given of a processing operation in the definition obtaining unit 207, that is, a method for obtaining the definition.

Figure 8:
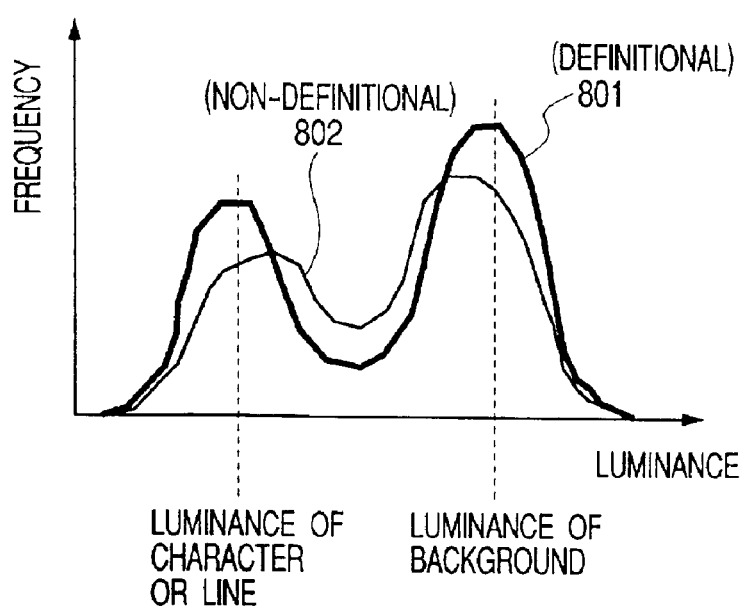
FIG. 8 is a graph showing histogram of luminance of each pixel.

As shown in a graph 801 of FIG. 8, there are a plurality of peaks in obtained histogram of luminance of the respective pixels in the frames in the scene 405 indicating the closed-up flip in then example of FIG. 4. If the blur of the camera or out-of-focus state is caused, the image of the subject is formed with mixture of a high-luminance portion and a low-luminance portion. Thus, middle-luminance components are increased as shown in a graph 802 of FIG. 8 and a standard deviation of the histogram is reduced. The determination of the standard deviation enables the definition to be digitized, and the definition is regarded to be higher when the standard deviation is larger.

Figure 9:
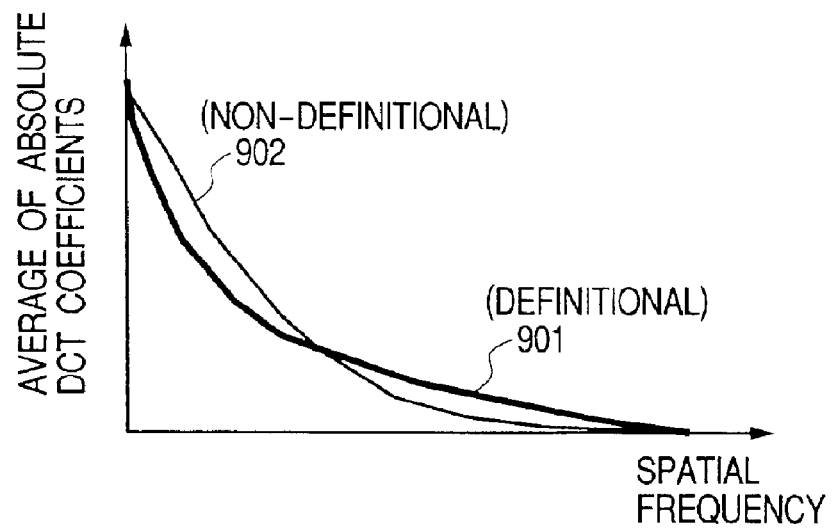
FIG. 9 is a graph showing spectrums of spatial frequency components.

Alternatively, if the blur or out-of-focus state of the camera is caused in the image having a distribution of spatial frequencies as shown in a graph 902 of FIG. 9, low-frequency components are increased in the spatial frequency. Therefore, when the image is encoded by the DCT etc., the definition can be digitized by obtaining the balance between the low-frequency component and the high-frequency component in the spatial frequency of the image.

Figure 10:
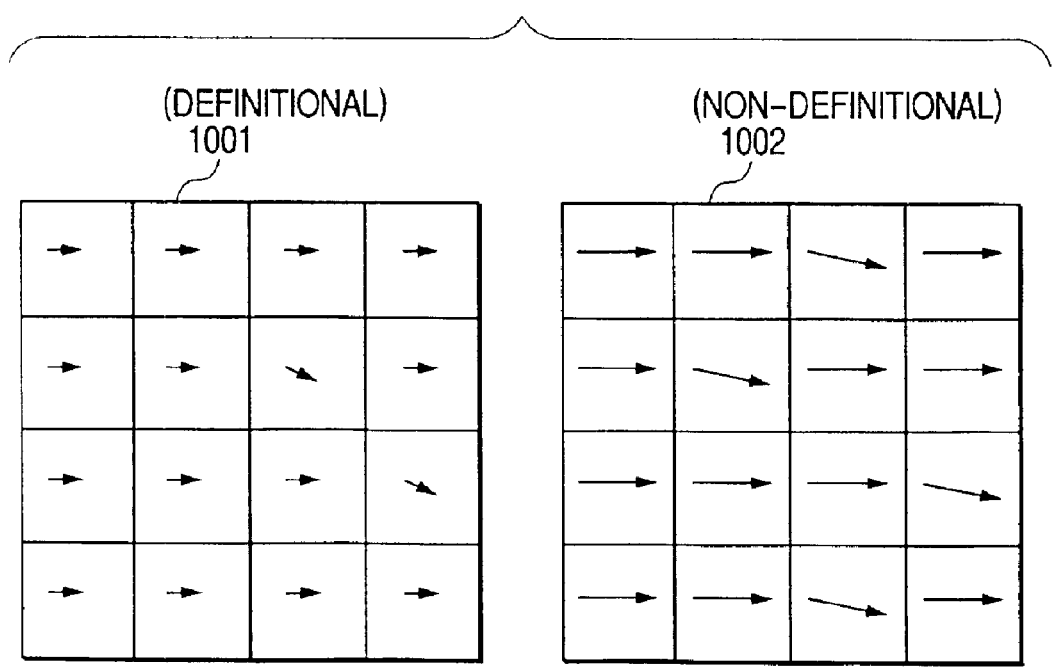
FIG. 10 is a diagram showing a motion vector for every block.

Alternatively, as shown in FIG. 10, it is possible to use motion vector information of every block upon encoding the image data, and the blur of the camera is reduced as the average of the motion vectors in one frame is smaller. Thus, the image is considered to be definitional. Therefore, the definition can be digitized by using the motion vector.

Figure 11:
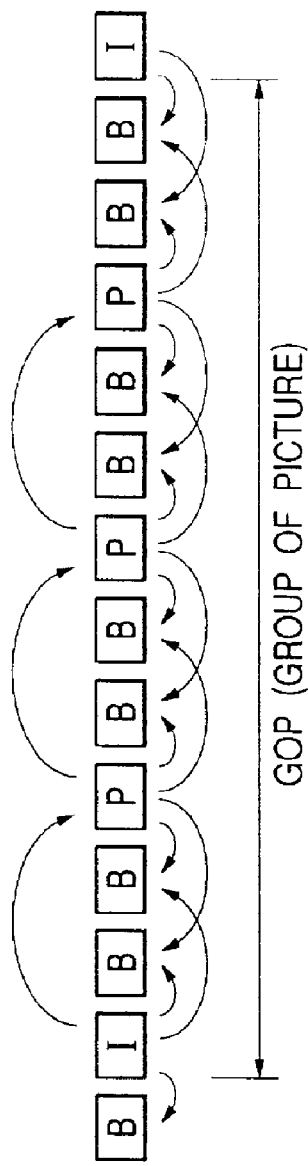
FIG. 11 is a diagram for explaining moving image data composed of an I-picture, a P-picture, and a B-picture.

As shown in FIG. 11, among an I-picture (encoded frame without inter-frame prediction), a P-picture (frame determined by encoding a difference estimated from the predicted image based on the past frame), and a B-picture (frame determined by encoding a difference estimated from the predicted image based on the past and future frames), as components of the moving image, generally, the I-picture can have the best picture-quality.

Figure 12:
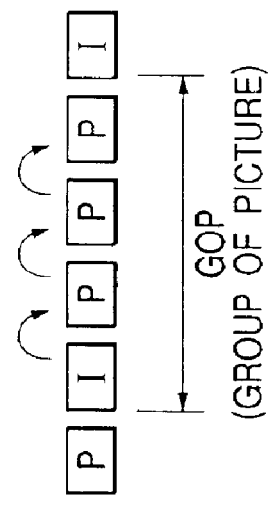
FIG. 12 is a diagram for explaining moving image data composed of the I-picture and P-picture.

Hence, the above-described process may be executed by using the I-pictures, regardless of the P-picture and the B-picture. However, since the encoded data of the P-picture or B-picture immediately before/after the subject frame includes a motion vector from the I-picture, when determining the motion vector of the I-picture, these included motion vectors are used. The moving image composed of only the I- and P-pictures as shown in FIG. 12 also uses the above-described method.

Although the above methods are used appropriately in the first embodiment, the definition may be digitized by any of the foregoing methods, by other methods, or by combining a plurality of methods.

Figure 7:
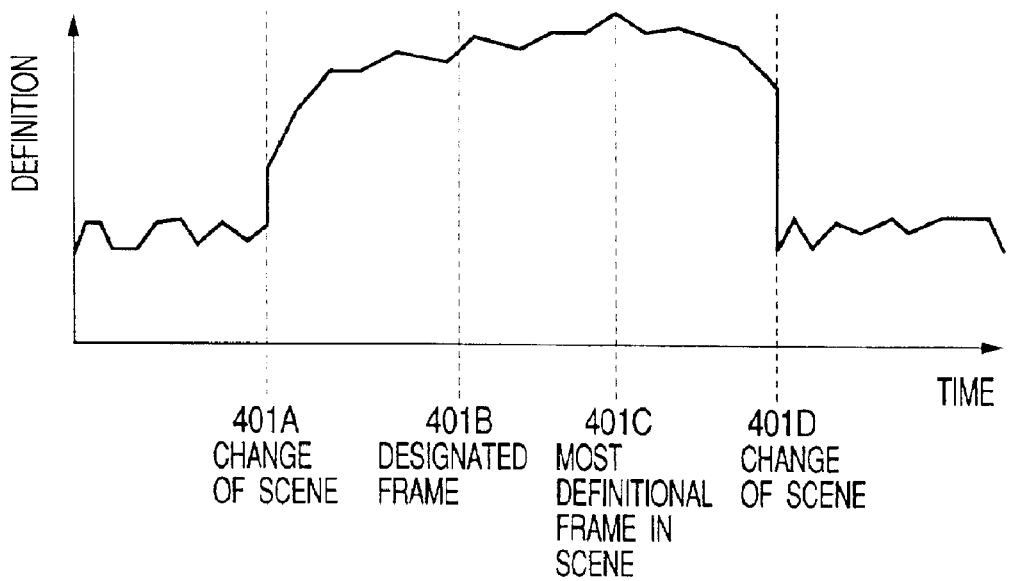
FIG. 7 is a graph showing digitized definition of each frame.

FIG. 7 is a graph showing the definition of the respective frames in the example of FIG. 4. As shown in FIG. 7, in the similarity range of the frames 401A to 401D, the definition of the frame 401C is the highest. The output frame determination unit 210 selects the frame 401C based on information on the similarity range transmitted from the similarity range obtaining unit 206 and information on the definition transmitted from the definition obtaining unit 207, and outputs the image data of the frame 401C to the still image storing unit 209 through the moving image decoding unit 205.

If there are a plurality of frames having substantially identical definition within the similarity range, those frames are assumed to have the identical definition by disregarding a slight definition difference and an output frame may be selected by taking into consideration other conditions. For example, a frame having a higher degree of similarity to the designated frame may be selected. Alternatively, a frame which is nearer to the designated frame with respect to time may be selected. In this case, strictly speaking, the "most definitional" frame is not outputted. However, in the determination in step S306, it is assumed that determination of the most definitional frame includes determining the frame having the definition which is substantially identical to the highest one.

As described above, according to the first embodiment, the user designates the output of the still image, then, the range of the successive frames having the image similar to the frame designated by the user is detected, the most definitional frame is automatically selected within the detected range, and the image data of the selected frame is outputted as the still image. Consequently, it is possible to indicate the image similar to that of the frame designated by the user, and to automatically select the more definitional frame.

Figure 13:
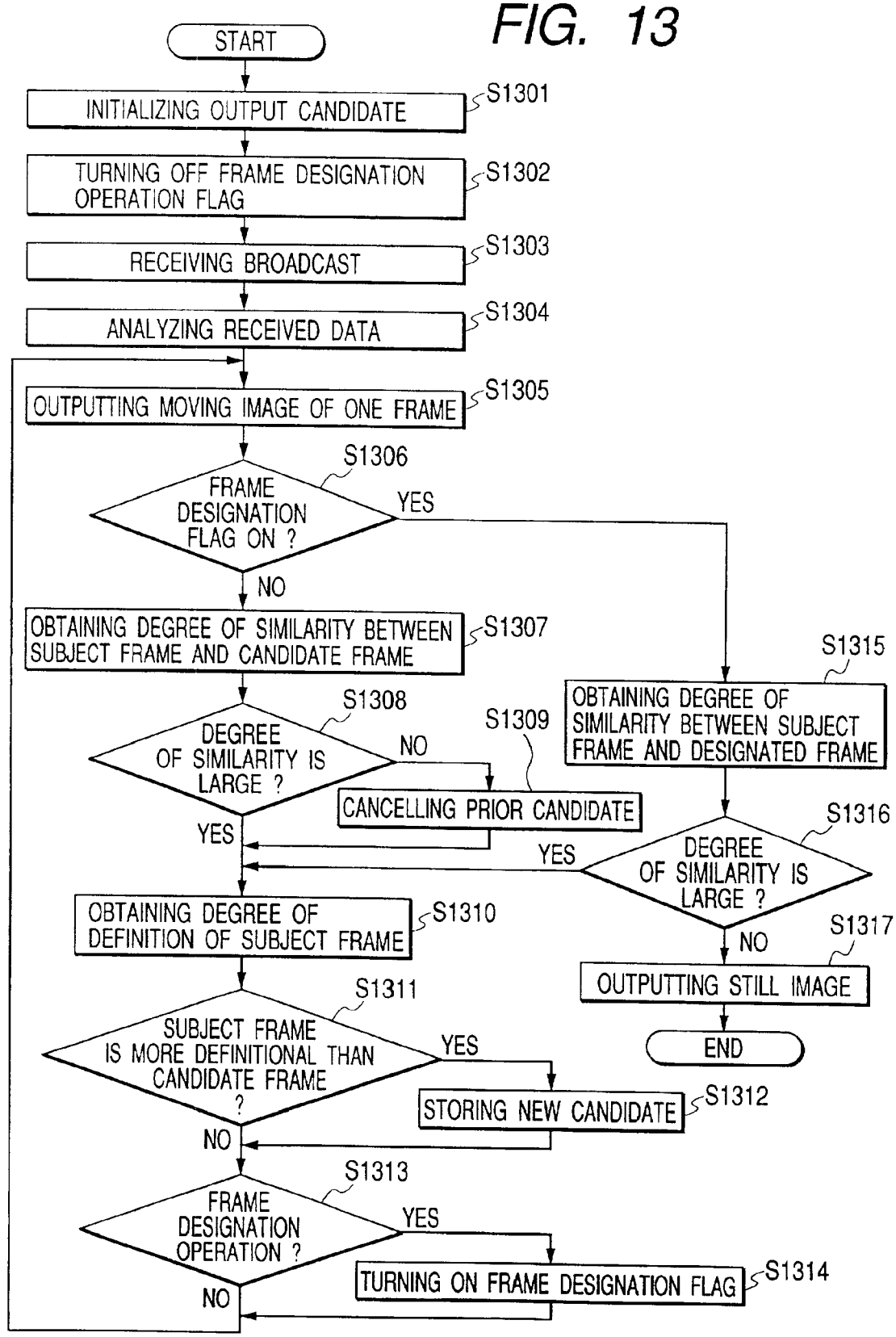
FIG. 13 is a flowchart for explaining a processing operation for outputting a still image.

Next, a description is given of a second embodiment of the present invention. The second embodiment employs the same structure of the hardware of the digital television receiver 100 in FIG. 1 and the same structure of the functions of the image output device in FIG. 2. Hereinbelow, according to the second embodiment, a description is given to explain a processing operation for outputting the still image with reference to a flowchart in FIG. 13.

In step S1301, the output frame determination unit 210 initializes a candidate of the output frame. In step S1302, the output frame determination unit 210 turns off an internal frame designation operation flag. In step S1303, the broadcast receiving unit 201 receives the digital television broadcast.

In step S1304, the received data analyzing unit 202 analyzes the received data, separates it into the moving image data, audio data, and other data, and stores them into the received data storing unit 203.

The received data analyzing unit 203 detects packets of the image data, audio data, and other data from the received MPEG2-TS, and stores the detected packets in the received data storing unit 203 as shown in a scene 1402 in FIG. 14. Note that, in the structure of the second embodiment, as will be described later, the received data storing unit 203 may store only the data at least necessary for executing a decoding process by the moving image decoding unit 205 and does not have to store data of duration of several to several tens seconds, as in the first embodiment.

In step S1305, the moving image decoding unit 205 decodes the encoded moving image data, and outputs the decoded moving image data to the moving image output unit 204 on a frame basis. In step S1306, the output frame determination unit 210 checks whether the internal frame designation operation flag is ON or OFF. If the internal frame designation operation flag is ON in step S1306, the processing routine advances to step S1315. If OFF in step S1306, the processing routine proceeds to step S1307.

In step S1307, the similarity range obtaining unit 206 obtains the degree of similarity between a subject frame outputted to the moving image output unit 204 from the moving image decoding unit 205 and a frame of a candidate of an output frame at present. The specific method is the same as that of the first embodiment. In step S1308, it is checked as to whether or not the degree of similarity detected is equal to a predetermined reference or more. If YES in step S1308, the processing routine advances to step S1310. If NO in step S1308, the processing routine proceeds to step S1309. In step S1309, a prior candidate of the output frame is canceled, the frame decoded at present is set to be a new candidate, and the routine proceeds to step S1310.

In step S1310, the definition obtaining unit 207 obtains the degree of definition of the frame, as a subject, which is outputted to the moving image output unit 204 from the moving image decoding unit 205. The specific method thereof is the same as that of the first embodiment.

In step S1311, the output frame determination unit 210 compares the degrees of definition between the subject frame outputted from the moving image decoding unit 205 with the frame which is the output candidate at present. If the subject frame outputted from the moving image decoding unit 205 is more definitional than the frame which is the out put candidate, the processing routine advances to step S1313. On the contrary, if not so in step S1311, the processing routine proceeds to step S1312. Note that, when the prior candidate of the output frame is canceled in step S1309, there is no object to be compared. Thus, the present frame becomes the candidate frame.

In step S1312, the output frame determination unit 210 stores the frame outputted by the moving image decoding unit 205 in the still image storing unit 209 as a new output image candidate and, in addition, it also stores the information on the degree of definition which is obtained in the definition obtaining unit 207. In step S1313, it is checked whether or not there is an instruction for outputting the still image by the operation unit 211. If YES in step S1313, the processing routine returns to step S1303. If NO in step S1313, the processing routine advances to step S1314 whereupon the output frame determination unit 210 turns on the internal frame designation operation flag. Then the processing routine returns to step S1303.

On the other hand, in step S1315, the similarity range obtaining unit 206 obtains the degree of similarity between the user's designated frame and a frame subsequent thereto. The specific method thereof is similar to that of the first embodiment.

In step S1316, the output frame determination unit 210 determines whether or not a degree of similarity between the user's designated frame and the subject frame outputted to the moving image output unit 204 from the moving image decoding unit 205 is equal to a predetermined reference or more, based on the information on the degree of similarity from the similarity range obtaining unit 206. If YES in step S1316, the processing routine advances to step S1310. If NO in step S1316, it proceeds to step S1317.

If the degree of similarity of both the frames are equal to the predetermined reference or more in step S1316, that is, the frame similar to the user's designated frame is outputted, the processing routine proceeds to S1310 whereupon the output frame determination unit 210 compares the degree of definition between the subject frame and the candidate frame.

If the degree of similarity is less than the predetermined reference in step S1316, the similarity range of the user's designated frame includes the frames up to the frame just before the subject one. Thus, in step S1317, the output frame determination unit 210 outputs the last one-frame image data remained as the output candidate of the still image, to the still image output unit 208 through the still image storing unit 209.

As mentioned above, according to the second embodiment, only the image data of one frame is stored in the still image storing unit 209 as an output candidate of the still image. Therefore, the memory capacity of the received data storing unit 209 can be smaller than that of the first embodiment and costs can be further reduced.

Next, a description is given to explain a third embodiment of the present invention. The third embodiment employs the same structure of the hardware of the digital television receiver 100 in FIG. 1 and the same structure of the functions of the image output device in FIG. 2. Hereinbelow, according to the third embodiment, a description is given of a processing operation of the similarity range obtaining unit 206.

As shown in FIG. 5, the respective frames within the range of the frames 401A to 401D indicating the closed-up flip in the example of FIG. 4 are exceedingly similar to the frame 401B. On the other hand, there is a low degree of similarity between the frame 401B and frames before the frame 401A and after the frame 401D.

According to the gist of the present invention, the similarities should be directly compared between the frame designated by the viewer and the frames in the vicinity thereof. However, in the example of FIG. 4, all the frames within the frames 401A to 401D can be assumed to have the substantially same contents, and therefore, there is no problem even if the most definitional frame is outputted as a still image from among the above frames, in place of the frame 401B. In other words, the scene change portion is detected and it is determined whether or not the detected portion belongs to the same scene. This determination can be regarded as indirect comparison of the similarity between the subject frame and the viewer's designated frame.

Figure 6:
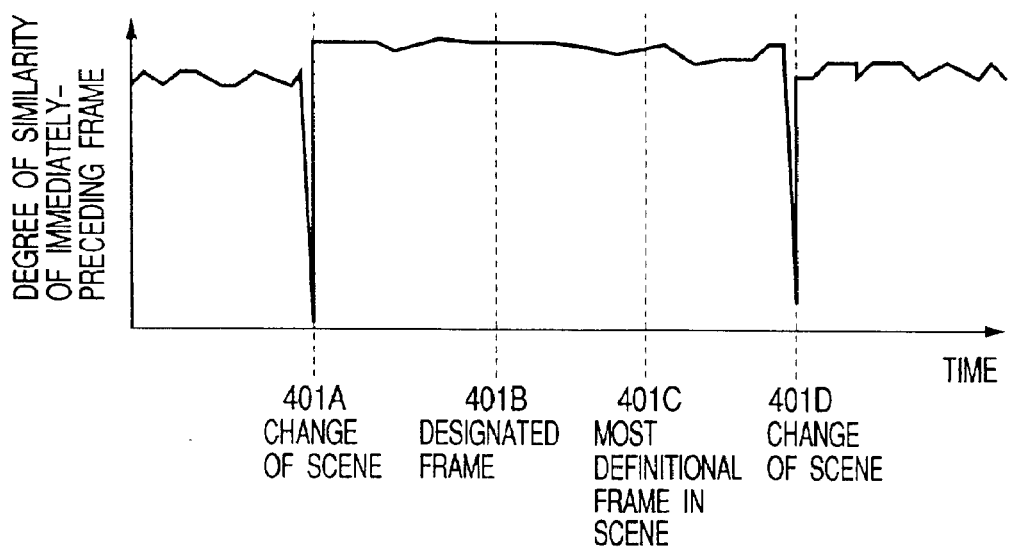
FIG. 6 is a graph showing digitized degrees of similarity between any desired frame and a frame just before it.

As shown in FIG. 6, the scene change portion can include a portion with a extremely low degree of similarity to the frame immediately before the scene change portion. The degree of similarity can be digitized in the above manner described in the first embodiment. Alternatively, in the case of the moving image composed of the I-, P-, and B-pictures as shown in FIG. 11, or moving image composed of the I- and P-pictures as shown in FIG. 12, the difference is smaller when the degree of similarity is higher. Therefore, a method for adding up the differences may be used.

Note that, since the means for detecting the scene change portion is available for other applications such as a scene search, various kinds of equipment loading the means is expected to be presented in the future. In this case, this means can be applied to the third embodiment.

A description is given to explain a fourth embodiment of the present invention, in which a creator or editor of the moving image data obtains the scene change in advance and information for designating the frame of the scene change is distributed as code data distributed together with the moving image data and the audio data.

In this case, on the transmission side, a data stream is transmitted by adding a flag indicating scene change to a header of a TS packet including the encoded image data of the head of the frame as the scene change. On the reception side, the frame of the scene change can be detected by detecting the information on the scene change from the header of the TS packet in the image data of the received MPEG2-TS.

Figure 3:
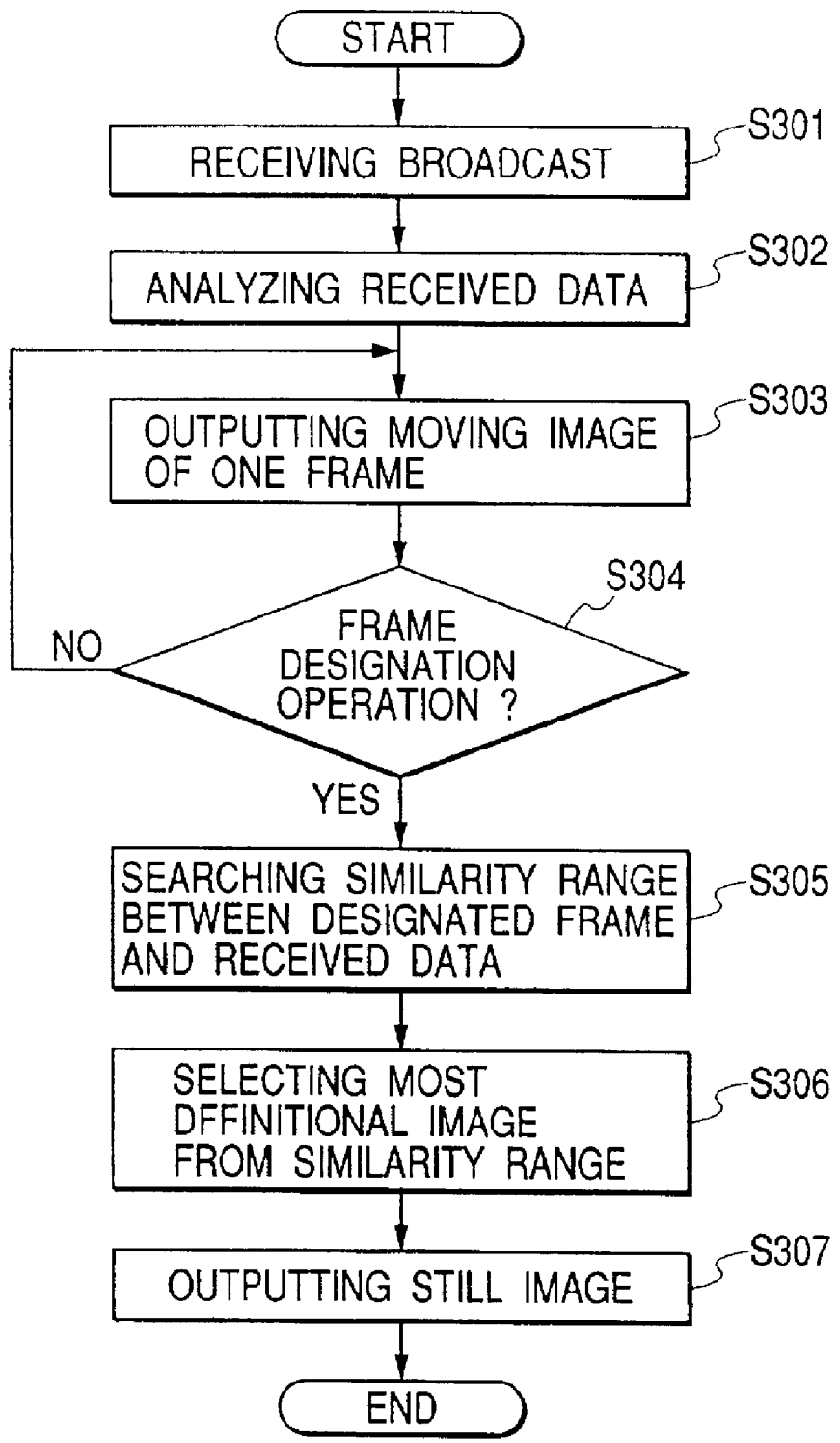
FIG. 3 is a flowchart for explaining a processing operation for outputting a still image.
Figure 15:
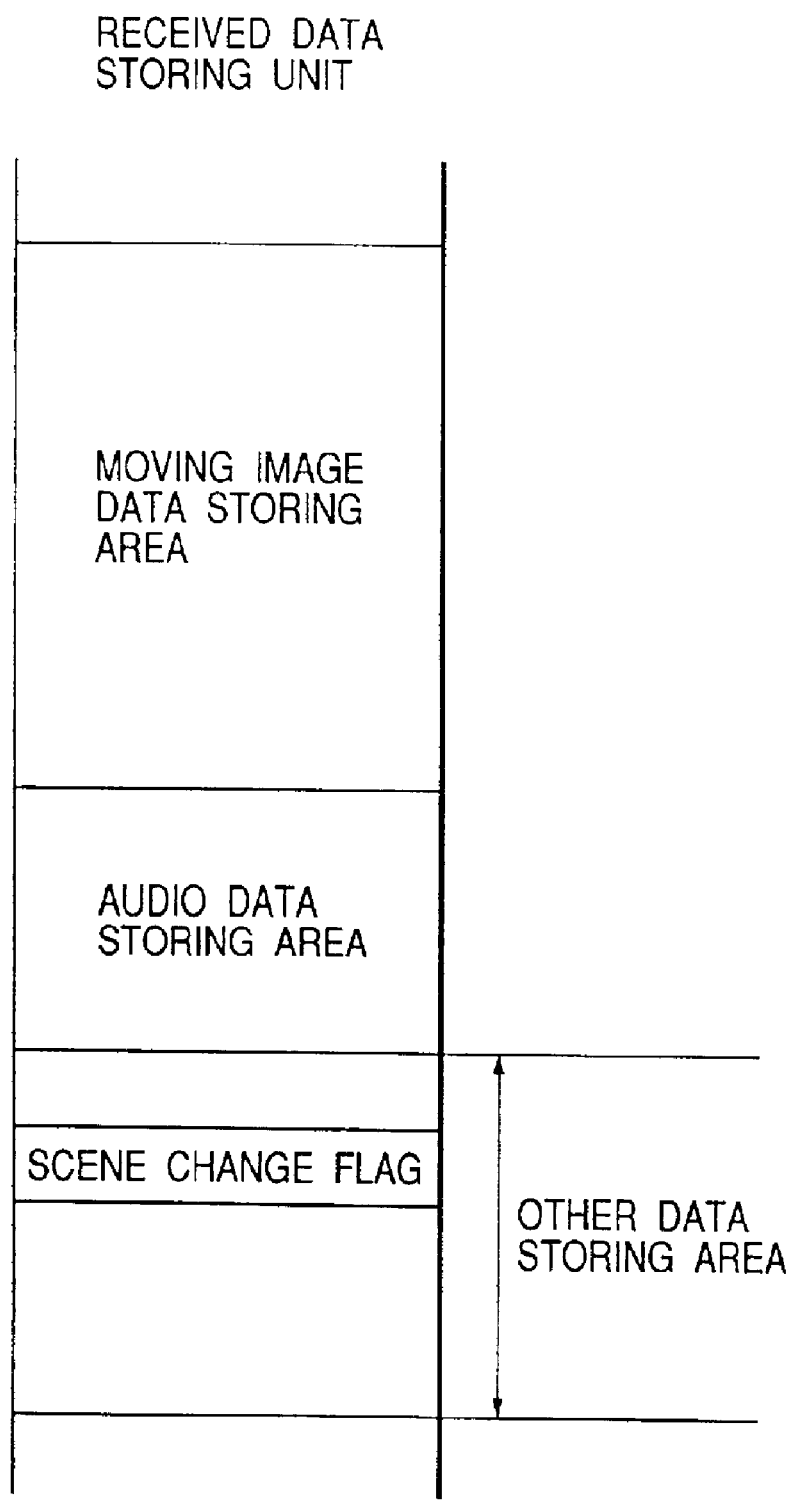
FIG. 15 is a diagram showing a storing portion of a scene change flag.

More specifically, in step S302 in the flowchart of FIG. 3, the received data analyzing unit 202 analyzes the headers of the TS packets of the respective moving images in the received data stream, detects the scene change flag, and stores the detected scene change flag in other data storing areas of the received data storing unit 203 as shown in FIG. 15. In step S305, the similarity range obtaining unit 206 determines the frame as the scene change based on the scene change flag shown in FIG. 15 and detects the similarity range.

As mentioned above, on the transmission side, a service for adding and distributing the flag showing the scene change is widely used for other applications such as the scene search. Therefore, this service is expected to be widely spread in the future. Since the digital television receiver does not need to perform the image processing to detect the scene by using the service, the calculation speed and the size in program can be reduced and the present invention can be realized with the lower-cost configuration.

A description is given to explain a fifth embodiment of the present invention, in which a creator or editor of the moving image data determines the definition in advance and information on the definition of the frame is distributed as code data distributed together with the moving image data and the audio data.

In this case, on the transmission side, a data stream is transmitted by adding information on the definition of the subject frame to a header of a TS packet including encoded image data of the head of the respective frames. On the reception side, the information on definition of the frame can be obtained by detecting the information on definition from the header of the TS packet in the image data of the received MPEG2-TS.

Figure 16:
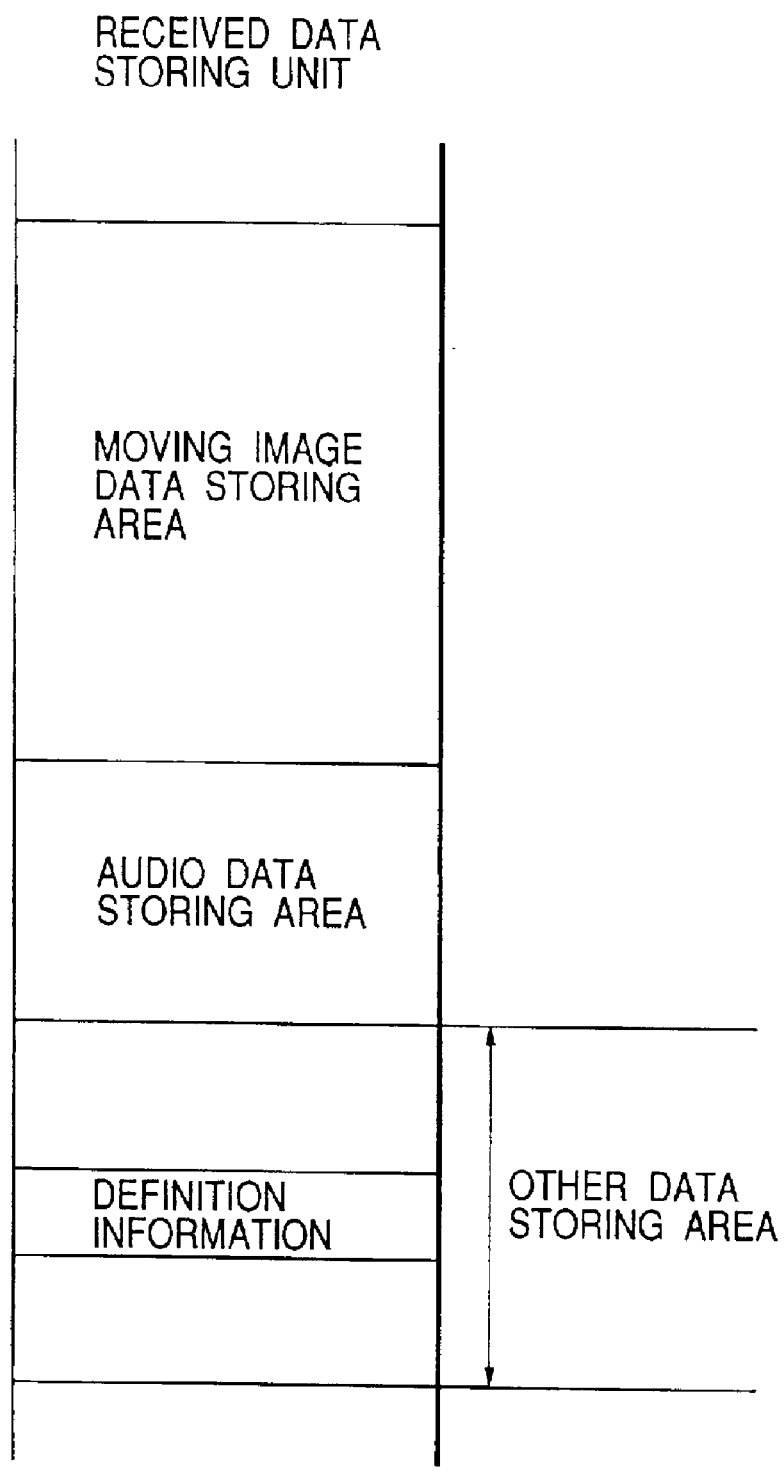
FIG. 16 is a diagram showing a storing portion of definition information.

More specifically, in step S302 in the flowchart of FIG. 3, the received data analyzing unit 202 analyzes the headers of the TS packets of the respective moving images in the received data stream, detects the information on the definition, and stores the detected information in other data storing areas of the received data storing unit 203 as shown in FIG. 16. In step S306, the definition obtaining unit 207 reads out the information on the definition shown in FIG. 16 from the received data storing unit 203 in accordance with an instruction from the output frame determination unit 210, and outputs the read-out information to the output frame determination unit 210. The output frame determination unit 210 selects an image of one frame which is the most definitional, in accordance with the information on the definition.

As described above, if a service for distributing the information on the definition is presented, since the digital television receiver does not need to perform the image processing to digitize the definition by using the service, the calculation speed and the size in program can be reduced and the present invention can be realized with the lower-cost configuration.

Next, a description is given to explain a sixth embodiment of the present invention. The sixth embodiment employs the same structure of the hardware of the digital television receiver 100 in FIG. 1.

Figure 17:
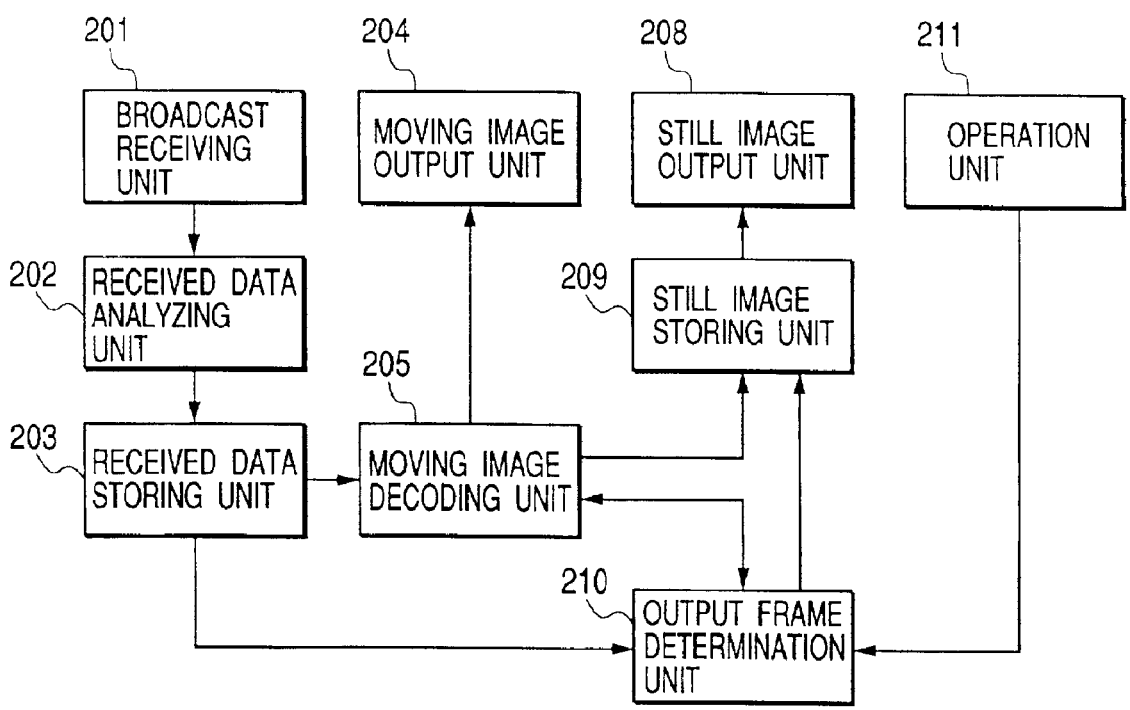
FIG. 17 is a diagram showing the structure of functions of an image output apparatus.

FIG. 17 is a block diagram showing the structure of functions of an image output device for receiving, in particular, the moving image data and outputting a predetermined frame as a still image to the printer, etc. when the frame is designated. Referring to FIG. 17, reference numeral 201 denotes a broadcast receiving unit; 202 denotes a received data analyzing unit; 203 denotes a received data storing unit; 204 denotes a moving image output unit; 205 denotes a moving image decoding unit; 208 denotes a still image output unit; 209 denotes a still image storing unit; 210 denotes an output frame determination unit; and 211 denotes an operation unit.

In the sixth embodiment, differently from the first embodiment, the still image to be outputted is not designated by the similarity range obtaining unit 206 or the definition obtaining unit 207, but it is designated by the output frame designation data included in the received data stream. Note that, in the structure of the hardware shown in FIG. 1, the above components are formed by the tuner 102, remote controller 103, demultiplexer 104, CPU 105, memory 108, and the like.

Figure 18:
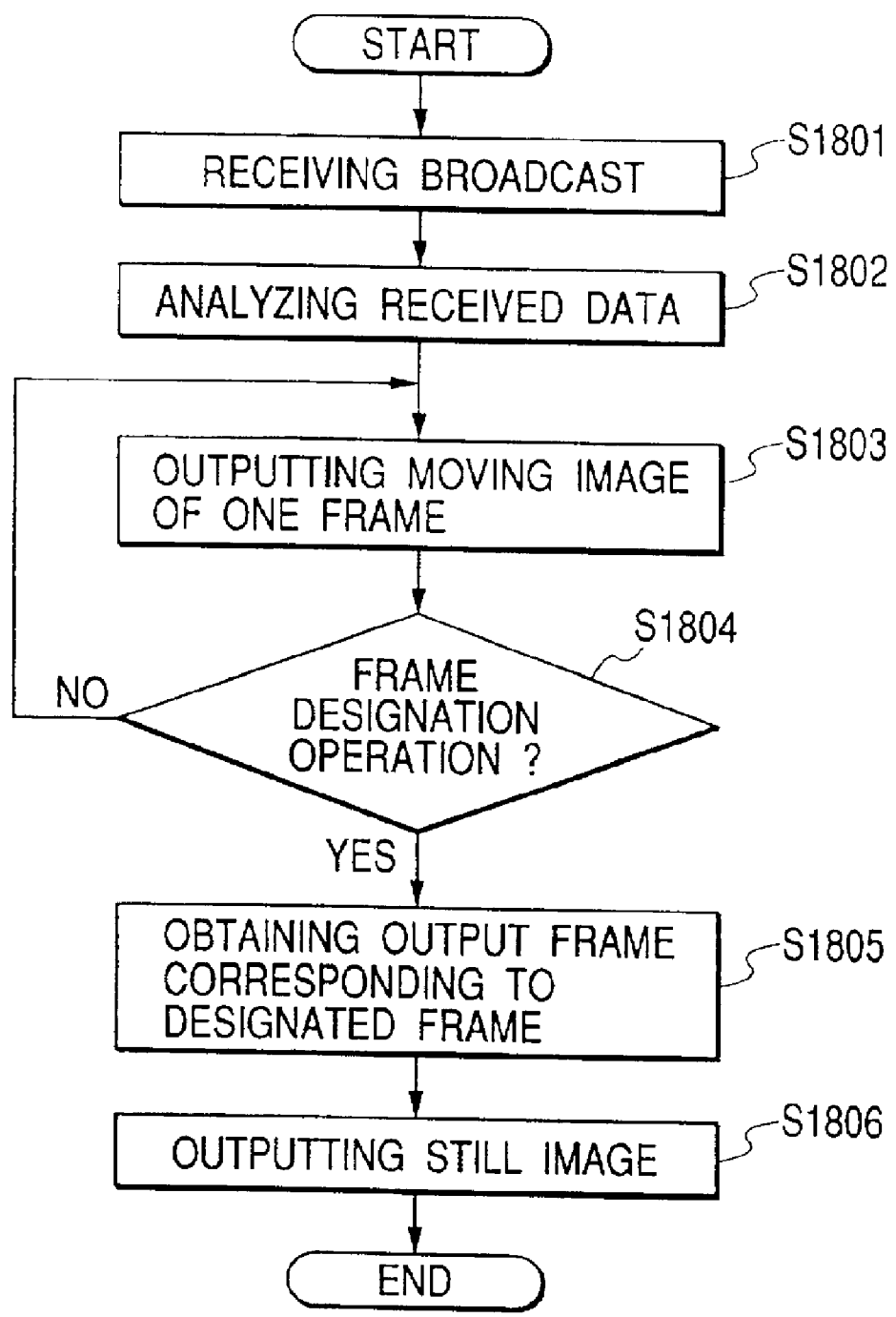
FIG. 18 is a flowchart for explaining a processing operation for outputting the still image.
Figure 19:
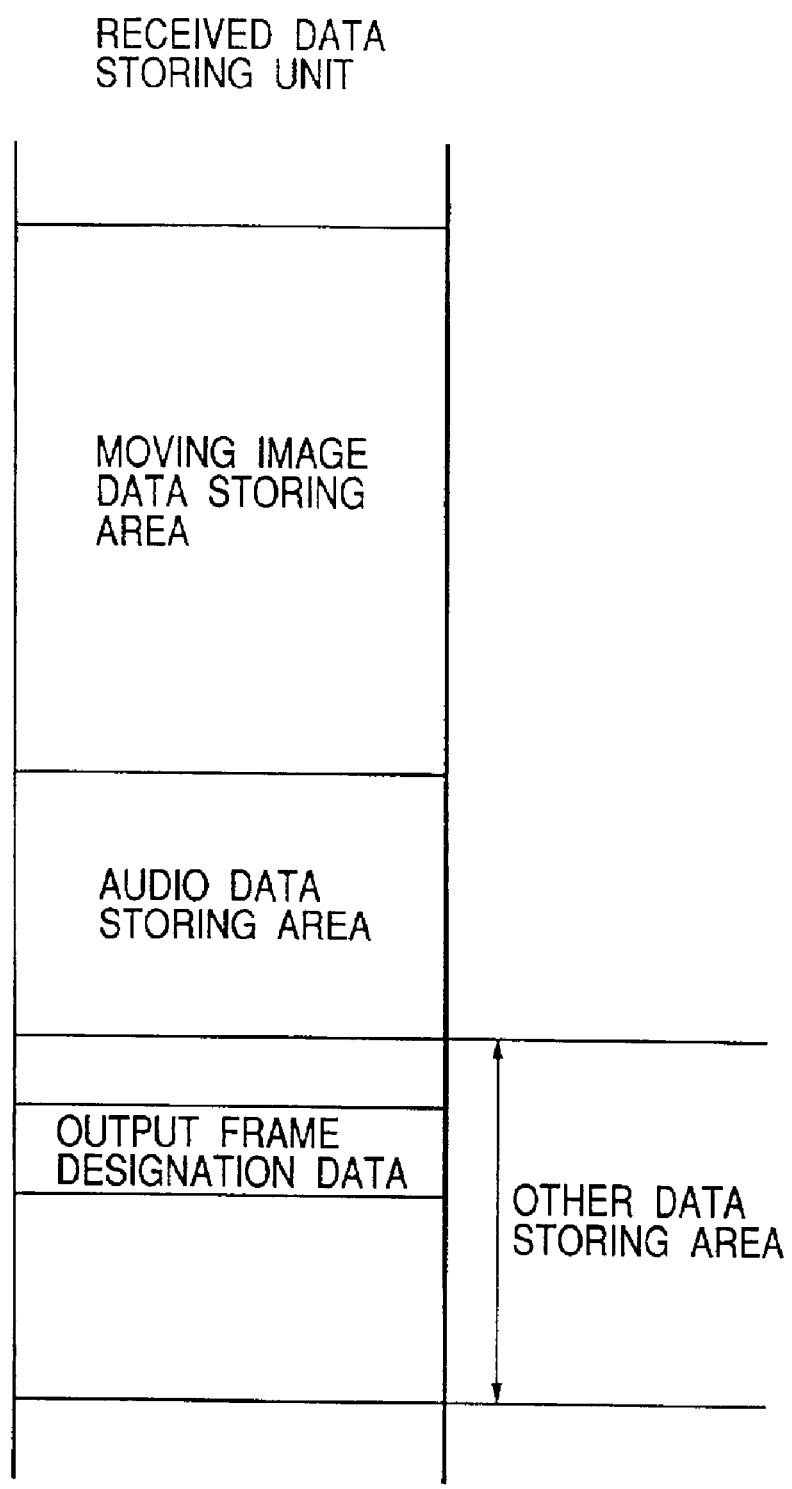
FIG. 19 is a diagram showing a storing portion of output frame designation data.

Next, a processing operation for outputting the still image is described with reference to a flowchart of FIG. 18.

In step S1801, the broadcast receiving unit 201 receives digital television broadcast. In step S1802, the received data analyzing unit 202 analyzes the received data, divides the analyzed data into the moving image data, audio data, and other data, and stores the divided data in the received data storing unit 203. In the sixth embodiment, the received data storing unit 203 also has at least a storage capacity of a data stream of duration of several to several tens seconds.

In the sixth embodiment, the received data stream includes an output frame designation data in the header of the TS packet containing the head of the respective frames of the image data.

The output frame designation data is the data having contents substantially similar to the image of the subject frame and indicating the number of frames up to the more definitional frame. For example, if the output frame is the past one from the subject one, is the future one, or coincides with the subject one, the number is a negative integer, a positive integer, or zero, respectively.

The received data analyzing unit 202 detects the frame designation data from the header of the TS packet and, then, stores the detected data in other data storage areas of the received data storing unit 203. In step S1803, the moving image decoding unit 205 decodes the encoded image data which is stored in the received data storing unit 203, and outputs the decoded data to the moving image output unit 204 on a frame basis.

In step S1804, it is checked whether or not the operation unit 211 instructs an output of the still image. If YES in step S1804, the processing routine advances to step S1805. If NO in step S1804, the processing routine returns to step S1803.

In step S1805, the output frame determination unit 210 obtains the output frame designation data for designating the output frame corresponding to the frame designated by the operation unit 211 from among the output frame designation data stored in the received data storing unit 203. In parallel therewith, the output frame determination unit 210 continues reception, storage, analysis, and output of the broadcast data (in steps S1801 and S1803) in real time and, if the output frame is a frame after the designated one (corresponding to the future one), the output frame determination unit 210 waits until reception of the output frame.

In step S1806, the output frame determination unit 210 reads out the output frame from the received data storing unit 203, decodes the read-out data through the moving image decoding unit 205, and outputs the decoded data to the still image storing unit 209. The still image output unit 208 reads out one-frame image data which is stored in the still image storing unit 209 at a proper timing, and outputs the image data to the printer P.

Referring to the example in FIG. 4, the frame designation data indicating the number of frames up to the most definitional frame 401C among the scene 405 is added to the TS packet header of each frame in the scene 405 indicating the substantially same image, i.e., the enlarged image of the flip. If the frame 401C is a frame which is twenty frames after the frame 401B and the viewer designates the frame 401B, the output frame determination unit 210 recognizes that the frame to be outputted is the one which is twenty frames after the frame 401B in accordance with the frame designation data of the frame 401B. The output frame determination unit 210 selects the frame 401C as the frame which is twenty frames after the frame 401B, and stores the image data of the frame 401C in the still image storing unit 209.

As mentioned above, according to the sixth embodiment, by utilizing the frame designation data added on the transmission side, it is possible to easily detect the more definitional frame having the contents similar to those of the user's designated frame.

Figure 20:
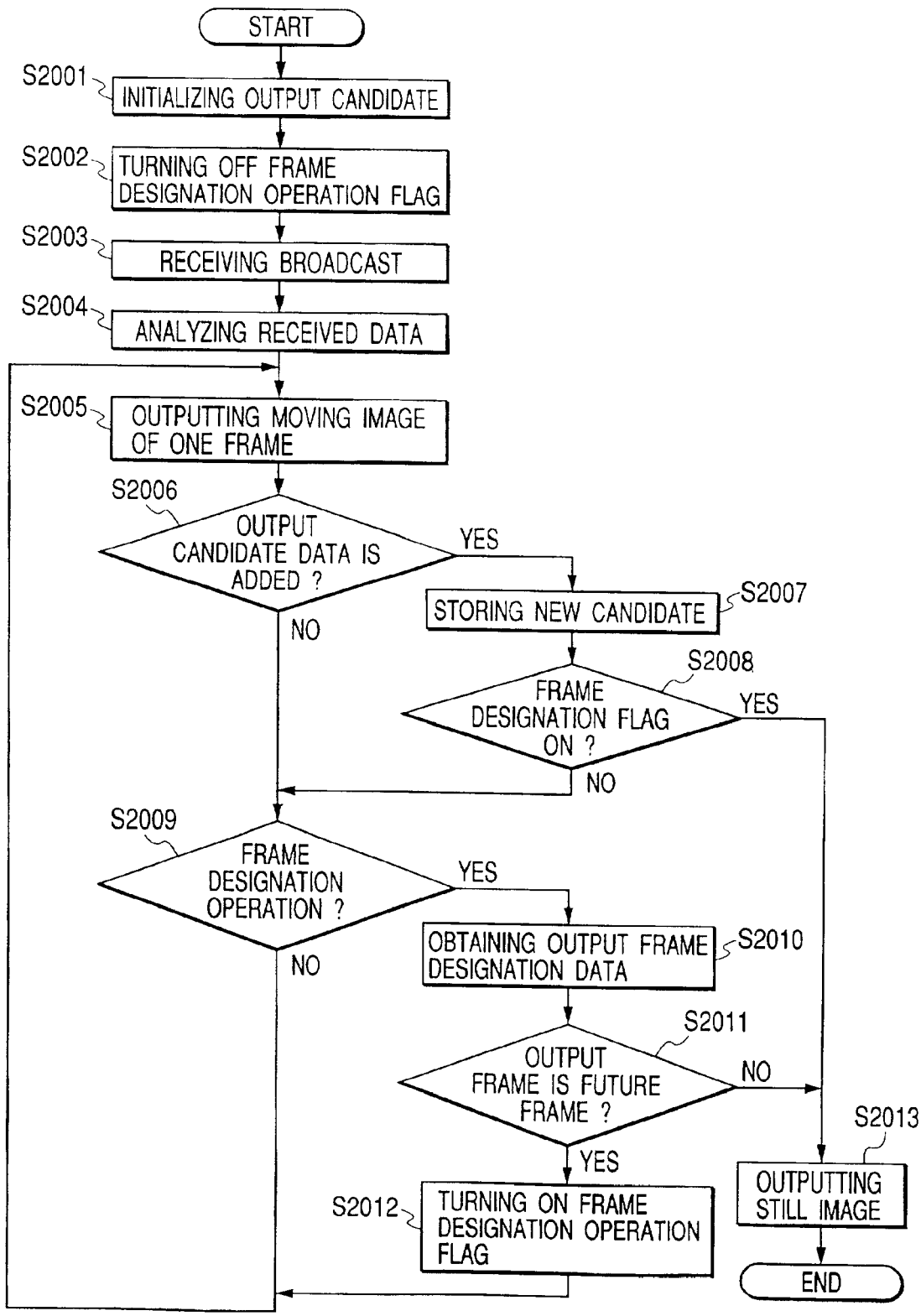
FIG. 20 is a flowchart for explaining a processing operation for outputting the still image.

Next, a description is given to explain a seventh embodiment of the present invention. The seventh embodiment employs the same structure of the hardware of the digital television receiver 100 in FIG. 1 and the same structure of the functions of the image output device in FIG. 17. Hereinbelow, according to the seventh embodiment, a description is given of a processing operation for outputting a still image with reference to a flowchart of FIG. 20.

In step S2001, the output frame determination unit 210 initializes a candidate of an output frame. In step S2002, the output frame determination unit 210 turns off an internal frame designation operation flag. In step S2003, the broadcast receiving unit 201 receives digital television broadcast.

In step S2004, the received data analyzing unit 202 analyzes the received data, separates the analyzed data into the moving image data, audio data, and other data, and stores the separated data into the received data storing unit 203.

In the seventh embodiment, the received data stream includes the output frame designation data in a header of a TS packet containing a head portion of each frame of the image data. Further, in the seventh embodiment, the frame designated as the output frame by other frames includes an output candidate data in the header of the TS packet containing the head portion of the subject frame. The output candidate data is not added to the frame which does not correspond to the output candidate by any other frames.

For example, in FIG. 4, when the frame 401C is designated by the respective frames in the scene 405 as the output frame, the output candidate data is added to the header of the TS packet including the frame 401C.

Figure 21:
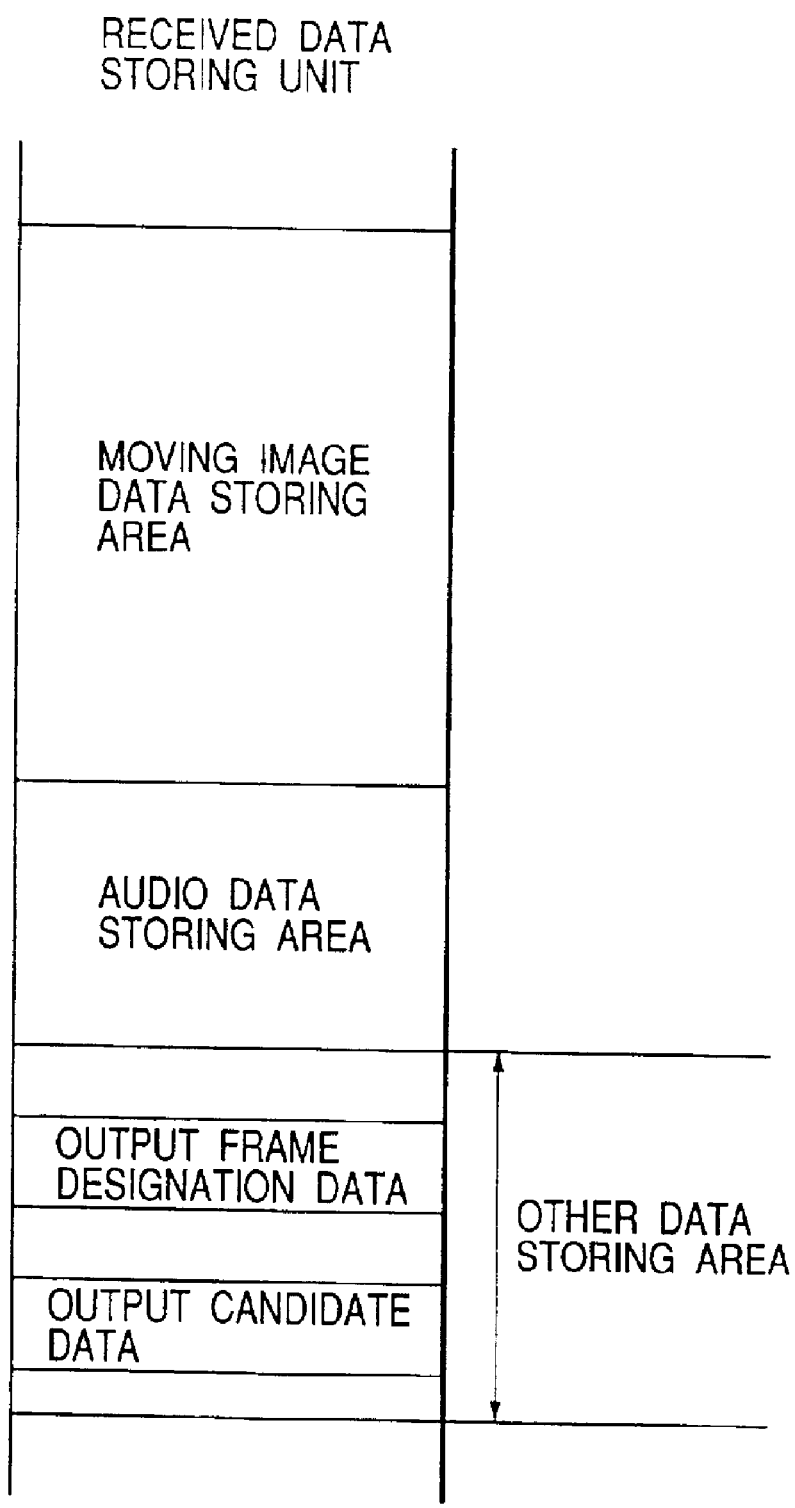
FIG. 21 is a diagram showing a status of the output frame designation data and output candidate data.

The received data analyzing unit 202 detects the frame designation data and the output candidate data from the received data stream, and stores the detected data in other data storing areas of the received data storing unit 203 as shown in FIG. 21.

Note that, in the seventh embodiment, as will be described later, although the received data storing unit 203 may store only the necessary and minimum data for the decoding process by the moving image decoding unit 205, it does not need to store data of duration of several to several tens seconds as mentioned above in the first embodiment.

In step S2005, the moving image decoding unit 205 decodes the encoded image data which is stored in the received data storing unit 203, and outputs the decoded data to the moving image output unit 204 on a frame basis.

In step S2006, the output frame determination unit 210 checks whether or not the output candidate data is added to the frame which is decoded and outputted by the moving image decoding unit 205. If YES in step S2006, the processing routine proceeds to step S2007. If NO in step S2006, the processing routine advances to step S2009.

In step S2007, the output frame determination unit 210 stores the image data of the subject frame decoded by the moving image decoding unit 205 at present, as a new output image candidate, in the still image storing unit 209. In step S2008, the output frame determination unit 210 checks whether or not an internal frame designation operation flag is turned on. If YES, the processing routine proceeds to step S2013. If NO, it proceeds to step S2009.

In step S2009, it is checked whether or not there is given an instruction of the operation unit 211 during the decoding process of the subject frame. If NO, the processing routine returns to step S2005. If YES, it advances to step S2010.

In step S2010, the output frame determination unit 210 obtains the output frame designation data added to the user's designated frame from the received data storing unit 203. As mentioned in the sixth embodiment, the output frame designation data can be indicated by the number of frames from the designated frame to the output one. If the output frame is a past one before the designated one, the number of frames is a negative integer. If the output frame is a future one after the designated one, the number of frames is a positive integer.

In step S2011, it is checked whether or not the output frame is a future one. If YES, the processing routine proceeds to step S2012. If NO, it advances to step S2013. In step S2012, the frame designation operation flag is turned on and the processing routine returns to step S2005. In step S2013, the output frame is not a future one, the image data of the output candidate of the still image has been already stored in the still image storing unit 209, and the output frame determination unit 210 outputs to the still image output unit 208 the image data of the frame stored in the still image storing unit 209.

Note that, according to the seventh embodiment, the past frame corresponds to the one before the frames stored as the output candidate at the time of the frame designation operation, and the future frame corresponds to the one after the frames which is a new output candidate at the time of the frame designation operation. Under the condition that the past frame and the future frame do not become the output frame, the seventh embodiment is satisfied. However, the condition is sufficiently satisfied on practical use and one frame suffices for the image storage capacity. Consequently, the configuration of the seventh embodiment can be realized with reduced costs.

Figure 22:
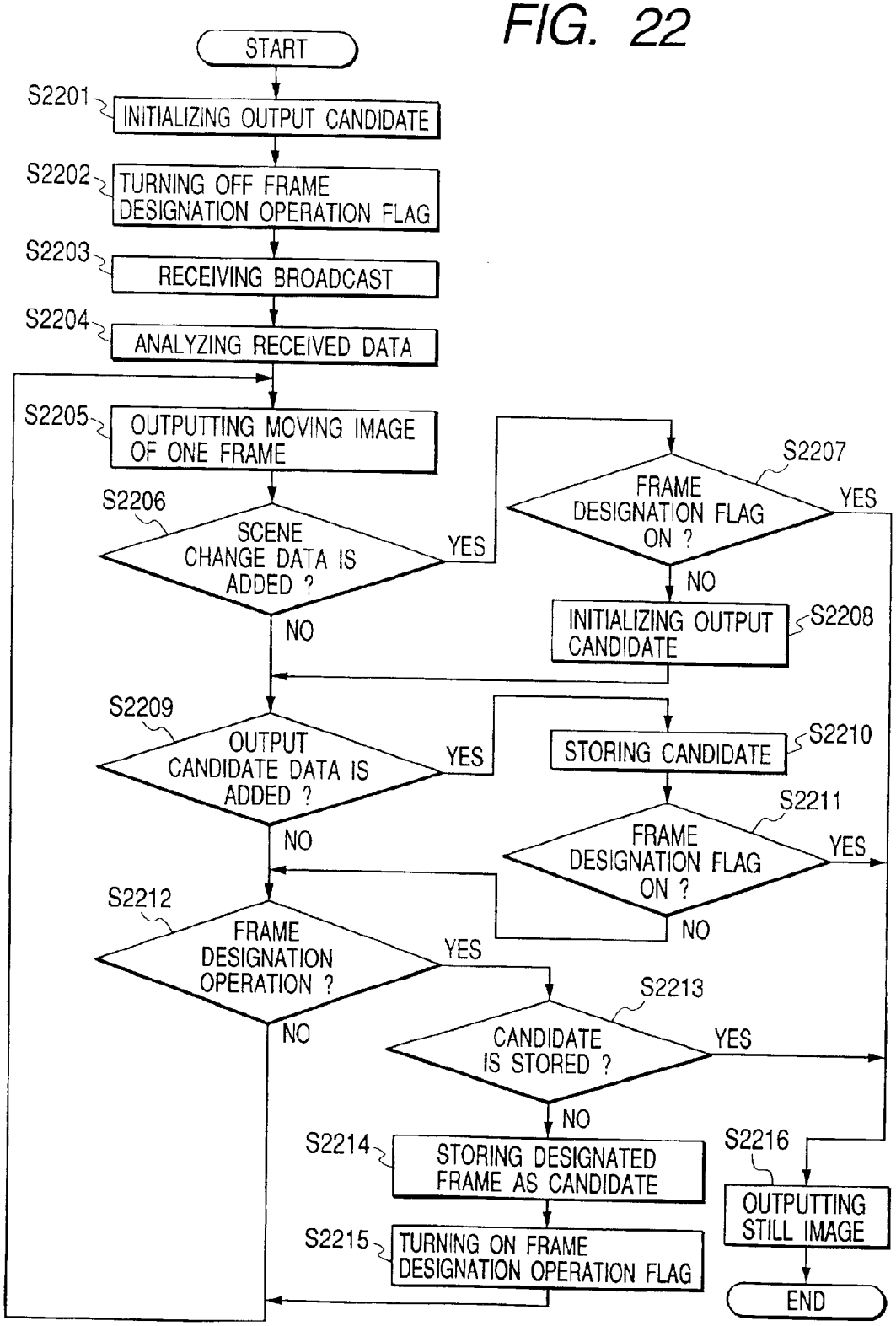
FIG. 22 is a flowchart for explaining a processing operation for outputting the still image.

Next, a description is given to explain an eighth embodiment of the present invention. The eighth embodiment employs the same structure of the hardware of the digital television receiver 100 in FIG. 1 and the same structure of the functions of the image output device in FIG. 17. Hereinbelow, according to the eighth embodiment, a description is given of a processing operation for outputting a still image with reference to a flowchart of FIG. 22.

In step S2201, the output frame determination unit 210 initializes a candidate of an output frame. In step S2202, the output frame determination unit 210 turns off an internal frame designation operation flag. In step S2203, the broadcast receiving unit 201 receives digital television broadcast.

In step S2204, the received data analyzing unit 202 analyzes the received data, separates the analyzed data into moving image data, audio data, and other data, and stores the separated data in the received data storing unit 203.

In the eighth embodiment, the frame which is the output frame designated by the other frames includes the output candidate data in a header of a TS packet containing a head portion of the subject frame. Further, as mentioned in the fifth embodiment, on the transmission side, besides the output candidate data, a flag indicating the scene change is added to the header of the TS packet including the encoded image data of the head portion of the scene change frame, and the data stream is then transmitted.

Figure 23:
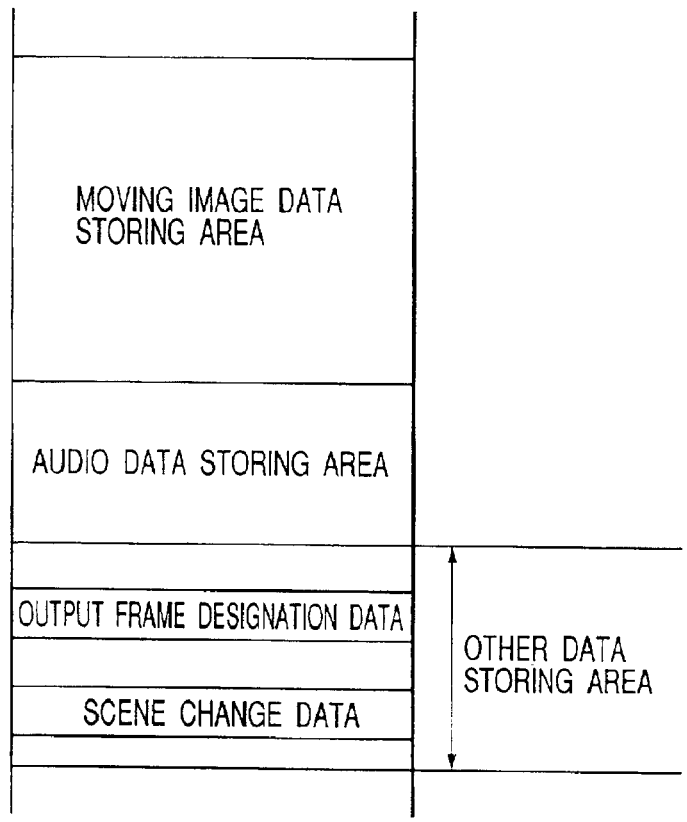
FIG. 23 is a diagram showing a status of the output frame designation data and scene change data.
Figure 24:
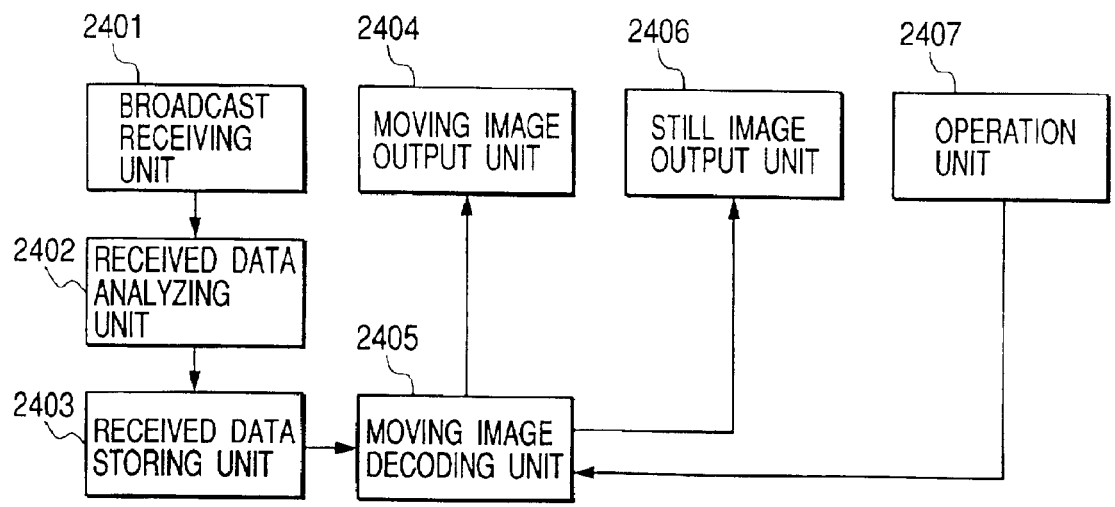
FIG. 24 is a diagram showing the structure of functions of a conventional digital television receiver.
Figure 25:
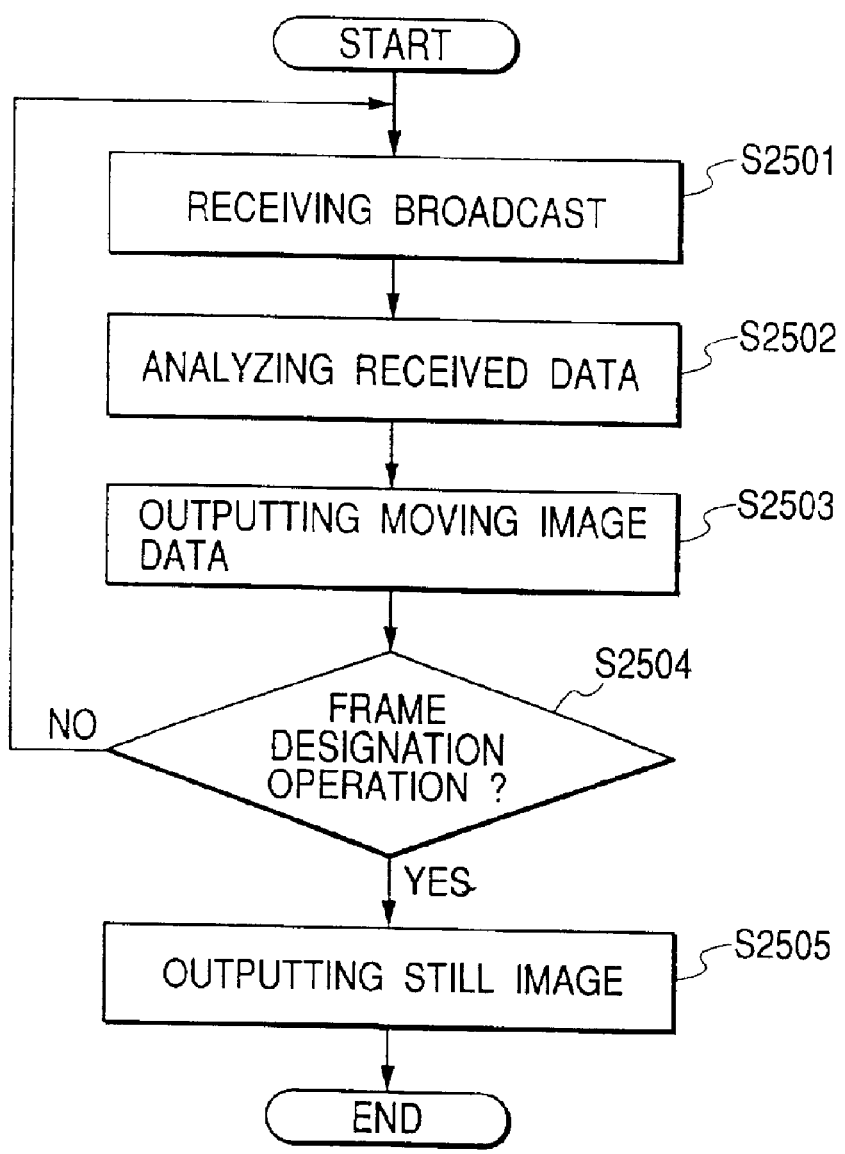
FIG. 25 is a flowchart for explaining a processing operation for conventionally outputting the still image.

The received data analyzing unit 202 detects the output candidate data and the scene change data from the received data stream, and stores the detected data in other data storing areas of the received data storing unit 203 as shown in FIG. 23.

In step S2205, the moving image decoding unit 205 decodes the moving image data which is outputted from the received data storing unit 203, and outputs the decoded data to the moving image output unit 204 on a frame basis. In step S2206, the output frame determination unit 210 checks whether or not the scene change data as shown in FIG. 23 is added to the frame which is outputted by the moving image decoding unit 205. If YES in step S2206, the processing routine proceeds to step S2007. If NO in step S2206, the processing routine advances to step S2209.

In step S2207, the output frame determination unit 210 checks whether or not an internal frame designation operation flag is turned on. If YES, the processing routine proceeds to step S2206. If NO, it advances to step S2208.

In step S2208, the output frame candidate is initialized. In step S2209, the output frame determination unit 210 checks whether or not the output candidate data as shown in FIG. 23 is added to the frame which is outputted by the moving image decoding unit 205. If YES, the processing routine proceeds to step S2210. If NO, it proceeds to step S2212.

In step S2210, the image data of the frame added with the candidate data is stored in the still image storing unit 209 as a new output image candidate. In step S2211, the output frame determination unit 210 checks whether or not the internal frame designation operation flag is turned on. If YES, the processing routine proceeds to step S2216. If NO, the processing routine advances to step S2212.

In step S2212, it is checked whether or not the operation unit 211 issues an instruction for outputting the still image. If NO, the processing routine returns to step S2205. If YES, it advances to step S2213.

In step S2213, the output frame determination unit 210 checks whether or not the image data which is to be a candidate of the output frame is stored in the still image storing unit 209. If YES, the processing routine proceeds to step S2216. If NO, that is, the data is still in the initialized state and new data is not additionally stored, the processing routine advances to step S2214.

In step S2214, stored in the still image storing unit 209 is the image data of the subject frame outputted by the moving image decoding unit 205 (that is, frame designated by the operation unit 211) as a temporary output frame candidate. This is the reason why that the frame designated by the operation unit 211 is outputted as the still image when there is no frame added with the output candidate data during a period from the frame added with the scene change data just before the designated frame to that just after the designated frame (i.e., period in which it is assumed that the frames indicate the same scene).

In step S2215, the frame designation flag is turned on and the processing routine returns to step S2215. In step S2216, the still image output unit 208 reads out the image data of the candidate frame of the still image output which is stored in the still image storing unit 209, and outputs it.

Since the eighth embodiment employs the scene change data, it is unnecessary to add the data to designate the output frame for each frame on the transmission side. A service for distributing the scene change data as the code data is available in a variety of cases, e.g., the scene search. Therefore, this service is expected to be widely spread in the future. Since only the output candidate data may be added by using the service, the eighth embodiment can be implemented by modifying the structure for distributing the moving image data to a small extent.

The objects of the present invention are accomplished by supplying to a computer (CPU or MPU) in an apparatus or system connected to various devices, program codes of software for implementing the functions of the first to eighth embodiments, and by operating the various devices in accordance with the program which is stored in the computer.

In this case, the program codes themselves of the software implement the functions of the first to eighth embodiments. The present invention includes the program codes themselves and means for supplying them to the computer, for example, a storing medium for storing the program codes. The storing medium for storing the program codes may be any one of a floppy disk, hard disk, optical disk, magneto-optical disk, CD-ROM, magnetic tape, nonvolatile memory card, ROM, and the like.

Also, when the functions of the first to eighth embodiments can be effected not only by executing the program codes supplied by the computer, but also by cooperation of the program codes and an OS (Operating System) or other application software operating on the computer, the above embodiments include the program codes.

Further, the present invention includes a case wherein the functions of the aforementioned respective embodiments can be effected by storing the supplied program codes in a memory provided in a function expansion board inserted to the computer or a function expansion unit connected to the computer, and by thereafter executing a part or all of the actual processes by the CPU, etc. provided for the function expansion board or function expansion unit on the basis of the instruction of the program codes.

As mentioned above, according to the first to eighth embodiments of the present invention, it is possible to output the more definitional frame having the same contents as those of the designated frame as the still image. Accordingly, it is possible to obtain and print out the still image having the same contents in which characters, etc. are definitional.

While the present invention has been described with reference to what is presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded with the broadest interpretation so as to encompass all such modifications and equivalent structures and functions.

What is claimed is:

1. An image processing apparatus comprising:

input means for inputting a data train including moving image data composed of a plurality of frames;

designating means for designating an arbitrary frame among said moving image data by viewer's operation;

definition detecting means for detecting definitions of a plurality of frames in said moving image data;

similarity range detecting means for detecting from among said moving image data a range of successive frames indicating an image similar to that of the frame designated by said designating means; and selecting means for selecting one frame from the moving image data inputted by said input means based on an output of said definition detecting means and an output of said similarity range detecting means.

2. An apparatus according to claim 1, wherein said selecting means selects the most definitional frame from a plurality of frames within said similarity range.

3. An apparatus according to claim 1, wherein said definition detecting means detects the definition by using said moving image data.

4. An apparatus according to claim 1, wherein said data train includes additional information indicating the definitions of said plurality of frames, and said definition detecting means detects the definition based on the additional information in the data train which is inputted by said input means.

5. An apparatus according to claim 1, wherein said similarity range detecting means detects the similarity range by using the moving image data.

6. An apparatus according to claim 1, wherein the data train includes additional information indicating scene change of said moving image data, and said similarity range detecting means detects the similarity range based on the additional information.

7. An apparatus according to claim 1, wherein said similarity range detecting means compares the image data of said designated frame with the image data of the plurality of frames of said moving image data, and detects the similarity range based on the comparison result.

8. An apparatus according to claim 1, wherein said similarity range detecting means compares image data of two adjacent frames in the moving image data, and detects the similarity range based on the comparison result.

9. An image processing apparatus comprising:

input means for inputting a data train including moving image data composed of a plurality of frames;

designating means for designating an arbitrary frame among said moving image data by viewer's operation;

similarity detecting means for detecting a similarity between the image data of two adjacent frames in said moving image data;

definition detecting means for detecting definitions of a plurality of frames in said moving image data; and selecting means for selecting one frame from said moving image data based on an output of said similarity detecting means and an output of said definition detecting means, and for storing the selected frame in storing means, wherein said selecting means reads out and outputs the image data of one frame which is stored in said storing means in accordance with a designating operation of said designating means.

10. An image processing apparatus comprising:

input means for inputting a data train including moving image data, definition information, and scene change information, said moving image data being composed of a plurality of frames, said definition information indicating a definition of each frame in said moving image data, and said scene change information indicating scene change of said moving image data;

designating means for designating an arbitrary frame among said moving image data by viewer's operation; and selecting means for selecting one frame with the same scene as the designated frame in the moving image data based on the definition information and the scene change information.

11. An image processing apparatus comprising:

input means for inputting a data train including moving image data and frame designation information, said moving image data being composed of a plurality of frames, and said frame designation information being added to said plurality of frames and indicating a predetermined frame in said plurality of frames;

designating means for designating an arbitrary frame among the moving image data by viewer's operation; and selecting means for selecting said predetermined frame from the moving image data based on the frame designation information added to the frame which is designated by said designating means.

12. An apparatus according to claim 11, wherein the data train includes selecting candidate information which is added to the predetermined frame, and said selecting means further selects the predetermined frame based on the selecting candidate information.

13. An image processing apparatus comprising:

input means for inputting a data train including moving image data, scene change information, and selecting candidate information, said moving image data being composed of a plurality of frames, said scene change information indicating scene change of said moving image data, and said selecting candidate information being added to a predetermined frame in said moving image data;

designating means for designating an arbitrary frame among the moving image data by viewer's operation; and selecting means for selecting the predetermined frame from the moving image data based on a designating operation of said designating means, the scene change information, and the selecting candidate information.

* * * * *